United States Patent
Kim et al.

(10) Patent No.: US 9,241,122 B2
(45) Date of Patent: Jan. 19, 2016

(54) DISPLAY DEVICE AND METHOD FOR CONTROLLING THE SAME

(71) Applicant: LG Electronics Inc., Seoul (KR)

(72) Inventors: Uniyoung Kim, Seoul (KR);
Choonkeun Youn, Seoul (KR);
Ryunghwa Rhee, Seoul (KR); Kunsik Lee, Seoul (KR); Byunghun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/228,650

(22) Filed: Mar. 28, 2014

(65) Prior Publication Data

US 2015/0201148 A1 Jul. 16, 2015

(30) Foreign Application Priority Data

Jan. 13, 2014 (KR) ........................ 10-2014-0003830

(51) Int. Cl.
*G06F 3/00* (2006.01)
*H04N 5/445* (2011.01)
*H04N 21/482* (2011.01)
(Continued)

(52) U.S. Cl.
CPC ....... *H04N 5/44591* (2013.01); *H04N 5/44543* (2013.01); *H04N 21/25891* (2013.01); *H04N 21/42204* (2013.01); *H04N 21/435* (2013.01); *H04N 21/4312* (2013.01); *H04N 21/4316* (2013.01); *H04N 21/4383* (2013.01); *H04N 21/4532* (2013.01); *H04N 21/4622* (2013.01); *H04N 21/4668* (2013.01); *H04N 21/4756* (2013.01); *H04N 21/4782* (2013.01); *H04N 21/47217* (2013.01); *H04N 21/4823* (2013.01);
(Continued)

(58) Field of Classification Search
CPC .............................................. H04N 2005/441
USPC .......................................................... 725/39
See application file for complete search history.

(56) References Cited

U.S. PATENT DOCUMENTS

2007/0089125 A1* 4/2007 Claassen ........................... 725/9
2008/0168496 A1* 7/2008 Lee et al. ......................... 725/39
(Continued)

FOREIGN PATENT DOCUMENTS

EP 2 487 921 A2 8/2012
WO WO 2008/021622 A2 2/2008

OTHER PUBLICATIONS

European Search Report dated Oct. 7, 2014 issued in Application No. 14164463.3 (full English text).

*Primary Examiner* — Nasser Goodarzi
*Assistant Examiner* — Michael Hong
(74) *Attorney, Agent, or Firm* — Ked & Associates, LLP

(57) ABSTRACT

A display device includes a display module configured to output a broadcast program and a channel banner list, a communication module configured to perform a data communication with an external server, a receiving unit configured to receive a channel change signal, a memory configured to store a viewing history data of a user, and a controller configured to control an operation of the display device, the controller is further configured to output a first broadcast channel banner list including a channel banner of broadcast channels received by the display device in a screen, receive a broadcast channel change signal more than a first number within a predetermined time period, output a second broadcast channel banner list having changed a size of the channel banner of the channels included in the first broadcast channel banner list.

13 Claims, 20 Drawing Sheets

(51) Int. Cl.
  *H04N 21/4782* (2011.01)
  *H04N 21/462* (2011.01)
  *H04N 21/435* (2011.01)
  *H04N 21/45* (2011.01)
  *H04N 21/258* (2011.01)
  *H04N 21/466* (2011.01)
  *H04N 21/475* (2011.01)
  *H04N 21/438* (2011.01)
  *H04N 21/431* (2011.01)
  *H04N 21/422* (2011.01)
  *H04N 21/472* (2011.01)

(52) U.S. Cl.
  CPC .. *H04N 21/4826* (2013.01); *H04N 2005/44556* (2013.01); *H04N 2005/44595* (2013.01)

(56) References Cited

U.S. PATENT DOCUMENTS

| | | | |
|---|---|---|---|
| 2009/0083798 A1* | 3/2009 | Lee | 725/46 |
| 2010/0186046 A1* | 7/2010 | Bae et al. | 725/56 |
| 2011/0276372 A1* | 11/2011 | Spivack et al. | 705/14.5 |
| 2014/0043355 A1* | 2/2014 | Kim et al. | 345/592 |

* cited by examiner

FIG. 10
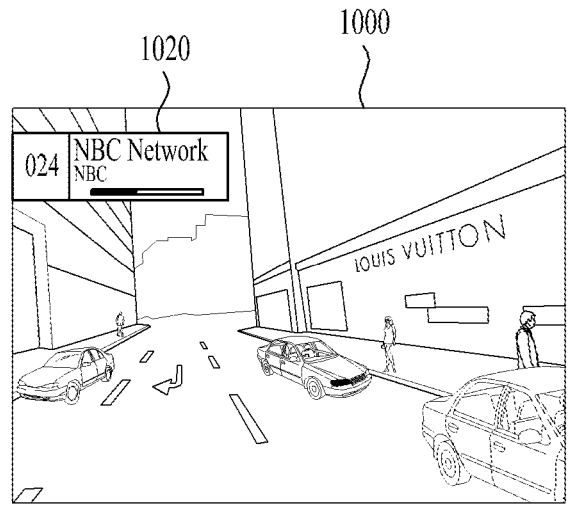
(a)
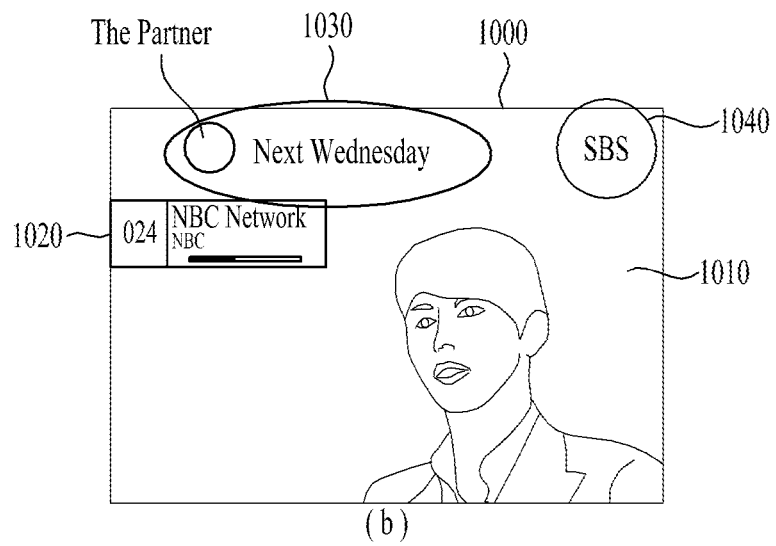
(b)

FIG. 12
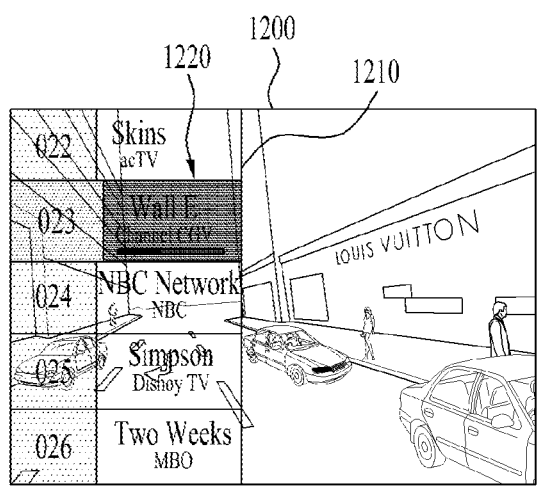
(a)
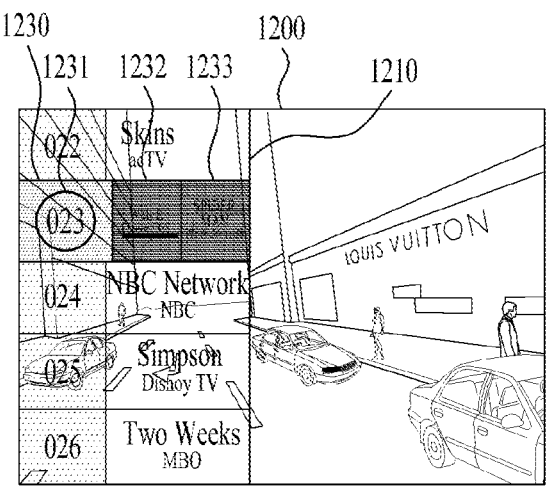
(b)
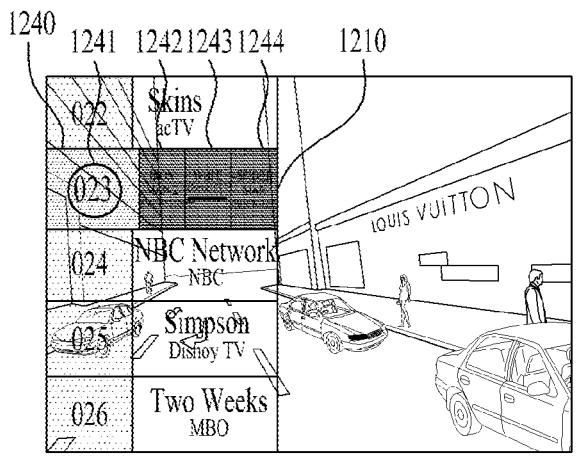
(c)
| EPG | | | November 13 (Sat) | |
|---|---|---|---|---|
| Channel | PM 6:30 | PM 7:00 | | PM 7:30 |
| 022 | Chess TV | The First | Fast Chess | Speed |
| 023 | Wall E | IRONMAN2 | Wall E | SPIDER MAN |
| 024 | NBC Network | Well-being food | Delicious Table | To Tasty |
| 025 | SBS | Magic Kid | TV English Village | Live |
| 026 | MBC | Moohandojeon E200 | | |
(d)

FIG. 13
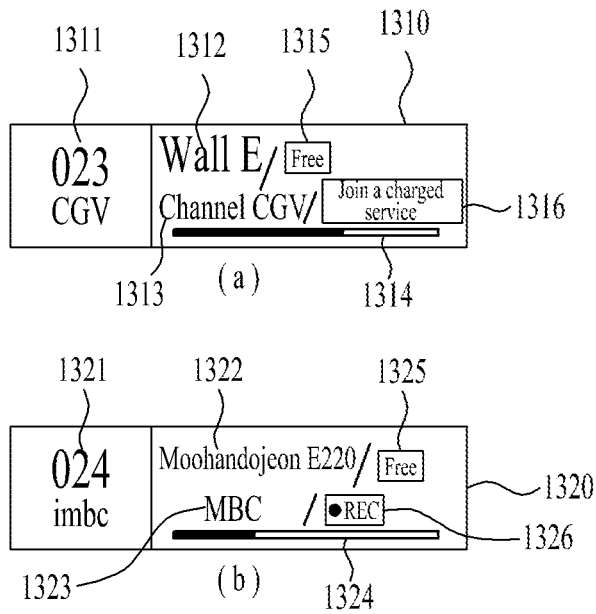
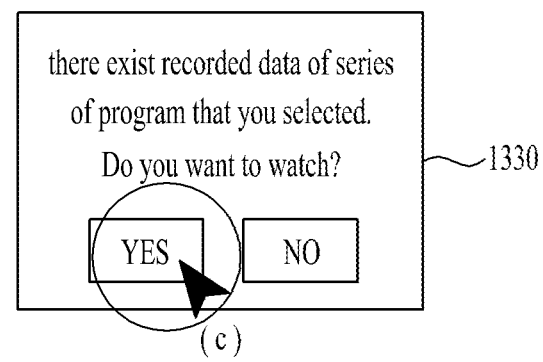
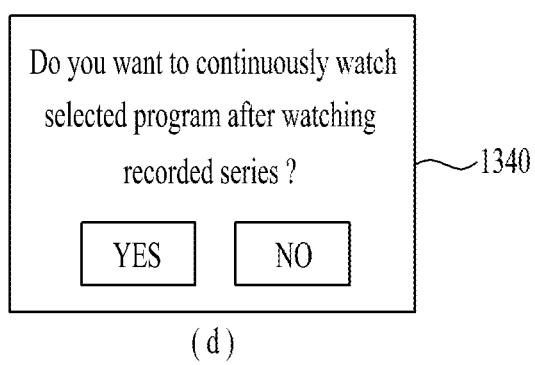

FIG. 15

| Data Base ( 2013.01.01 ~ 2013.02.01 ) | | | | |
|---|---|---|---|---|
| channel number | the number of access | last watching date | watching time | priority |
| 1511<br>1 | 1521<br>2 | 1531<br>2013.01.30 | 1541<br>40 minutes | 1551<br>3 |
| 1512<br>2 | 1522<br>3 | 1532<br>2013.01.27 | 1542<br>1 hour and 30 minutes | 1552<br>2 |
| 1513<br>3 | 1523<br>1 | 1533<br>2013.01.25 | 1543<br>3 hours | 1553<br>1 |
| 1514<br>4 | 1524<br>0 | 1534<br>No Data | 1544<br>No Data | 1554<br>4 |
| ⋮ | ⋮ | ⋮ | ⋮ | ⋮ |

DISPLAY DEVICE AND METHOD FOR CONTROLLING THE SAME

CROSS-REFERENCE TO RELATED APPLICATIONS

Pursuant to 35 U.S.C. §119(a), this application claims the benefit of the Korean Patent Application No. 10-2014-0003830, filed on Jan. 13, 2014, which is hereby incorporated by reference as if fully set forth herein.

BACKGROUND OF THE INVENTION

1. Field of the Invention

The present invention relates to a technology applicable to various display devices, and more particularly, to a display device designed to change an output of a channel banner according to a use pattern of a user and a method of controlling therefor.

2. Discussion of the Related Art

A display device can receive additional information of a broadcast channel which is received via a reception unit. The additional information of the broadcast channel may include title information of the broadcast channel, program information broadcasted on the broadcast channel, and the like. The display device can generate a channel banner including the additional information of the broadcast channel and can output the channel banner in a screen. Moreover, the display device can generate a channel banner list in a manner of collecting a channel banner of channels received via the reception unit and can output the channel banner list in the screen. And, the display device can allocate and store a channel number not only on a broadcast channel but also in an application or a web page. And, the display device can perform a pairing with at least one external device. And, the display device can perform a data communication with the paired external device. For instance, the display device may correspond to a cellular phone, a smartphone, a computer, a tablet PC, a notebook, a netbook, a TV (television), other broadcast receiving device, and the like.

SUMMARY OF THE INVENTION

Accordingly, the present invention is directed to an apparatus and method thereof that substantially obviate one or more problems due to limitations and disadvantages of the related art.

An object of one embodiment of the present invention is to promptly search for a broadcast program intended by a user to watch the program in a manner of controlling a size of a channel banner to be changed by analyzing a channel change signal of the user.

Another object of a different embodiment of the present invention is to make a user easily recognize a broadcast channel of high viewer preference in a manner of differently configuring a size of a channel banner for a broadcast channel of high view ratings from that of a channel banner for a broadcast channel of low view ratings.

The other object of a further different embodiment of the present invention is if predetermined number of channel change signals are received in a predetermined time, to specifically define a problem-solving plan or a solution to increase convenience of a user intending to use a different content except a currently output content in a manner of outputting a recommended content page or a channel browser.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a display device includes a display module configured to output a broadcast program and a channel banner list in a screen, a communication module configured to perform a data communication with an external server, a reception unit configured to receive a channel change signal, a memory configured to store a viewing history data of a user, and a controller configured to control an operation of the display device, the controller configured to output a first broadcast channel banner list including a channel banner of broadcast channels received by the display device in a screen, the controller configured to receive a broadcast channel change signal more than a first number within a predetermined time period, the controller configured to control a second broadcast channel banner list, which has changed a size of the channel banner of the channels included in the first broadcast channel banner list, to be output in the screen.

To further achieve these and other advantages and in accordance with the purpose of the present invention, according to one embodiment, according to one embodiment, a method of controlling a display device includes the steps of outputting a first broadcast channel banner list including a channel banner of broadcast channels received by the display device in a screen, receiving a broadcast channel change signal more than a first number within a predetermined time period, and outputting a second broadcast channel banner list, which has changed a size of the channel banner of the channels included in the first broadcast channel banner list, in the screen.

According to one embodiment of the present invention, by controlling a size of a channel banner to be changed in a manner of analyzing a channel change signal of a user, the user can more promptly search for a broadcast program intended to watch.

According to a different embodiment, it may be able to make a user easily recognize a broadcast channel of high viewer preference in a manner of differently configuring a size of a channel banner for a broadcast channel of high view ratings from that of a channel banner for a broadcast channel of low view ratings.

According to a further different embodiment, if predetermined number of channel change signals are received in a predetermined time, it may be able to specifically define a problem-solving plan or a solution to increase convenience of a user intending to use a different content except a currently output content in a manner of outputting a recommended content page or a channel browser.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 is a diagram for explaining an example for a display device according to one embodiment of the present invention to determine an output position of a channel banner using ACR;

FIG. 12 is a diagram for explaining an example for a display device according to one embodiment of the present invention to provide additional information by partitioning a channel banner;

FIG. 13 is a diagram for explaining channel additional information included in a channel banner generated by a display device according to one embodiment of the present invention;

FIG. 15 is a diagram for explaining a data base to store a view history data of a user in a memory of a display device according to one embodiment of the present invention;

DETAILED DESCRIPTION OF THE INVENTION

In the following description, the present invention is explained in detail with reference to drawings.

A suffix 'module' and 'unit' for a composing element in the following description is simply used for clarity of writing the present specification. Thus, the 'module' and the 'unit' can be used in a manner of being mixed.

Moreover, while the embodiments of the present invention have been concretely described with reference to the attached diagrams and the contents written on the diagrams, the present invention may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

Figure 1:
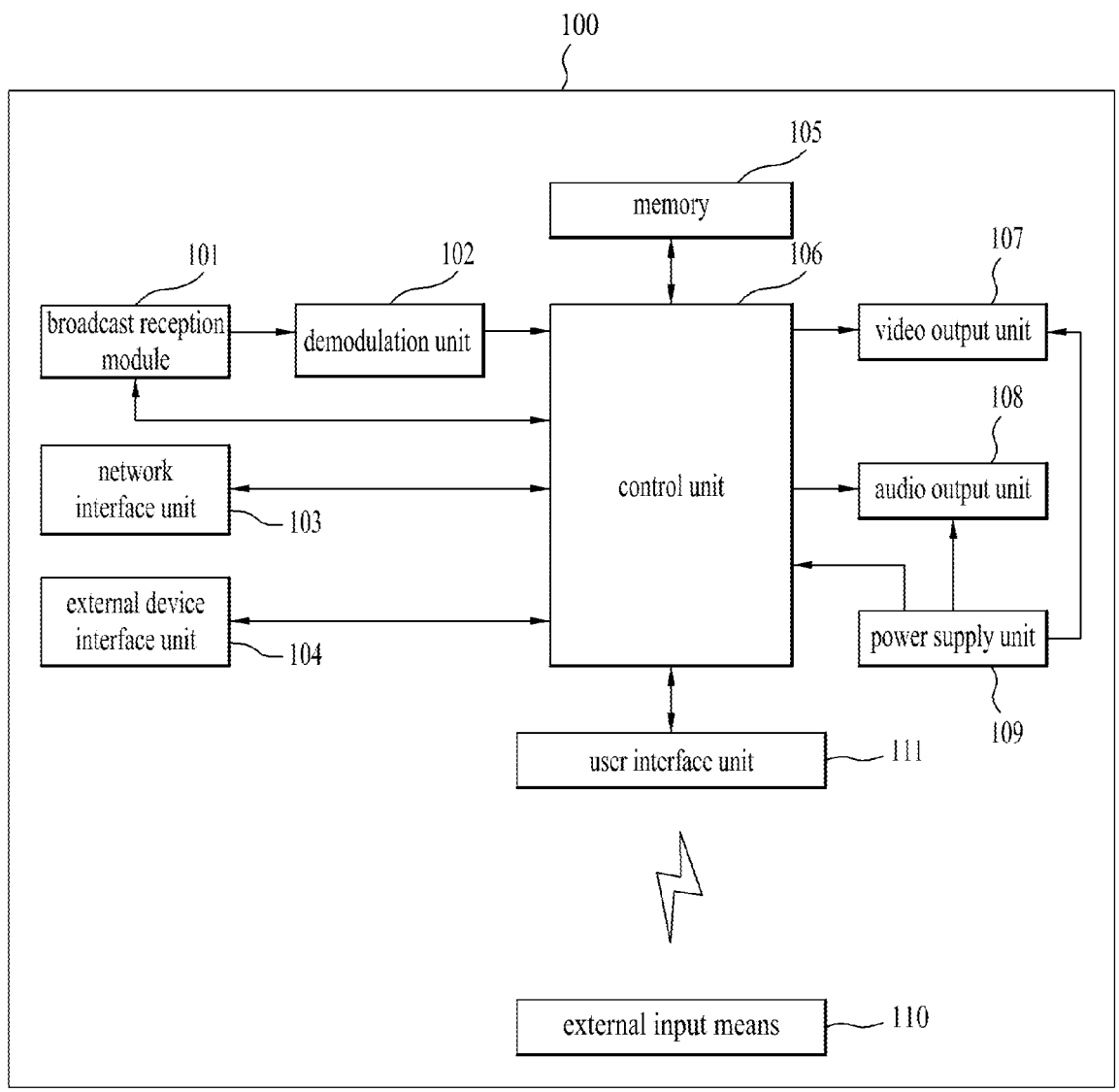
FIG. 1 is a detail block diagram for components of a display device according to one embodiment of the present invention.

FIG. 1 is a detail block diagram for components of a display device according to one embodiment of the present invention. As depicted in FIG. 1, a display device 100 according to one embodiment of the present invention consists of a broadcast reception module 101, a demodulation unit 102, a network interface unit 103, an external device interface unit 104, a memory 105, a control unit 106, a video output unit 107, an audio output unit 108, a power supply unit 109, an external input means 110, a user interface unit 111, and the like. Meanwhile, the display device 100 is designed to perform a data communication with a remote controller corresponding to the external input means 110 and a keyboard. The external input means is explained as the remote controller in the following description. The remote controller shall be described in detail with reference to FIG. 3 and FIG. 4.

For instance, the broadcast reception module 101 can be designed by an RF tuner or an interface receiving a broadcast data from such an external device as an STB and the like. For instance, the broadcast reception module 101 can receive an RF broadcast signal of a single carrier according to an ATSC (advanced television system committee) scheme or an RF broadcast signal of a plurality of carriers according to a DVB (digital video broadcasting) scheme.

The demodulation unit 102 performs a demodulation operation in a manner of receiving a digital IF signal (DIF) converted by the broadcast reception module 101. For instance, if the digital IF signal output from the broadcast reception module 101 corresponds to the ATSC scheme, the demodulation unit 102 performs 8-VSB (8-vestigal side band) demodulation. And, the demodulation unit 102 may perform a channel decoding.

The external device interface unit 104 is an interface enabling a data communication to be performed between an external device and a digital display device 100. The external device interface unit 104 can be connected with such an external device as a DVD (digital versatile disk), a Blue-ray, a gaming device, a camera, a camcorder, a computer (notebook), an STB, and the like in wired or wireless. The external device interface unit 104 delivers a video, an audio, or a data signal inputted from an external to the control unit 106 via the connected external device. And, the external device interface unit 104 can output the video, the audio, or the data signal processed in the control unit 106 to the external device. For instance, the external device interface unit 104 may include a USB terminal, a CVBS (composite video banking sync) terminal, a component terminal, an S-video terminal (analog), a DVI (digital visual interface) terminal, an HDMI (high definition multimedia interface) terminal, an RGB terminal, a D-SUB terminal, and the like.

The network interface unit 103 provides an interface to connect the display device 100 to a wired/wireless network including the internet network. For instance, the network interface unit 103 can be equipped with an Ethernet terminal and the like to access a wired network and may use such a communication standard as WLAN (wireless LAN)(WiFi), Wibro (wireless broadband), Wimax (world interoperability for microwave access), HSDPA (high speed downlink packet access) and the like to access a wireless network. The network interface unit 103 can transceive data with a different user or a different display device via an accessed network or a different network linked to the accessed network.

The memory 105 may store a program configured to process and control each signal in the control unit 106 and may store a signal-processed video, an audio, or a data signal. And, the memory 105 may perform a function of temporarily storing a video, an audio, or a data signal inputted from the external device interface unit 104 or the network interface unit 103. Moreover, the memory 105 stores various OS, a middleware, and a platform.

The user interface unit 111 delivers a signal inputted by a user to the control unit 106 or transmits a signal transmitted from the control unit 106 to an external device (e.g., the remote controller 110). For instance, the user interface unit 111 is designed to receive such a control signal as power on/off, channel selection, screen setting and the like from the remote controller 110 according to such various communication schemes as an RF (radio frequency) communication scheme, an infrared-ray (IR) communication scheme and the like and process them. Or, the user interface unit is designed to transmit a control signal transmitted from the control unit 106 to the remote controller 110.

The control unit 106 demultiplexes a stream inputted via the broadcast reception module 101, the demodulation unit 102, the network interface unit 103, or the external device interface unit 104, processes demultiplexed signals, and may be then able to generate and output a signal used for outputting a video or an audio. The control unit 106 shall be explained in more detail with reference to FIG. 2.

The video output unit 107 generates an actuation signal in a manner of converting a video signal, a data signal, an OSD signal processed in the control unit 106 or a video signal, a data signal and the like received by the external device interface unit 104 to R, G, and B signal, respectively. The video output unit 107 may correspond to a PDP, a LCD, an OLED, a flexible display, a 3D display or the like.

The audio output unit 108 receives a signal audio-processed in the control unit 106, e.g., a stereo signal, a 3.1 channel signal, or a 5.1 channel signal, and outputs the signal as an audio. The audio output unit 108 can be implemented by a speaker of various forms.

The power supply unit 109 supplies power for the overall display device 100. In particular, the power supply unit can supply power to the control unit 106 implementable by a form of system on chip (SOC), the video output unit 107 configured to display a video, and the audio output unit 108 configured to output an audio.

Figure 2:
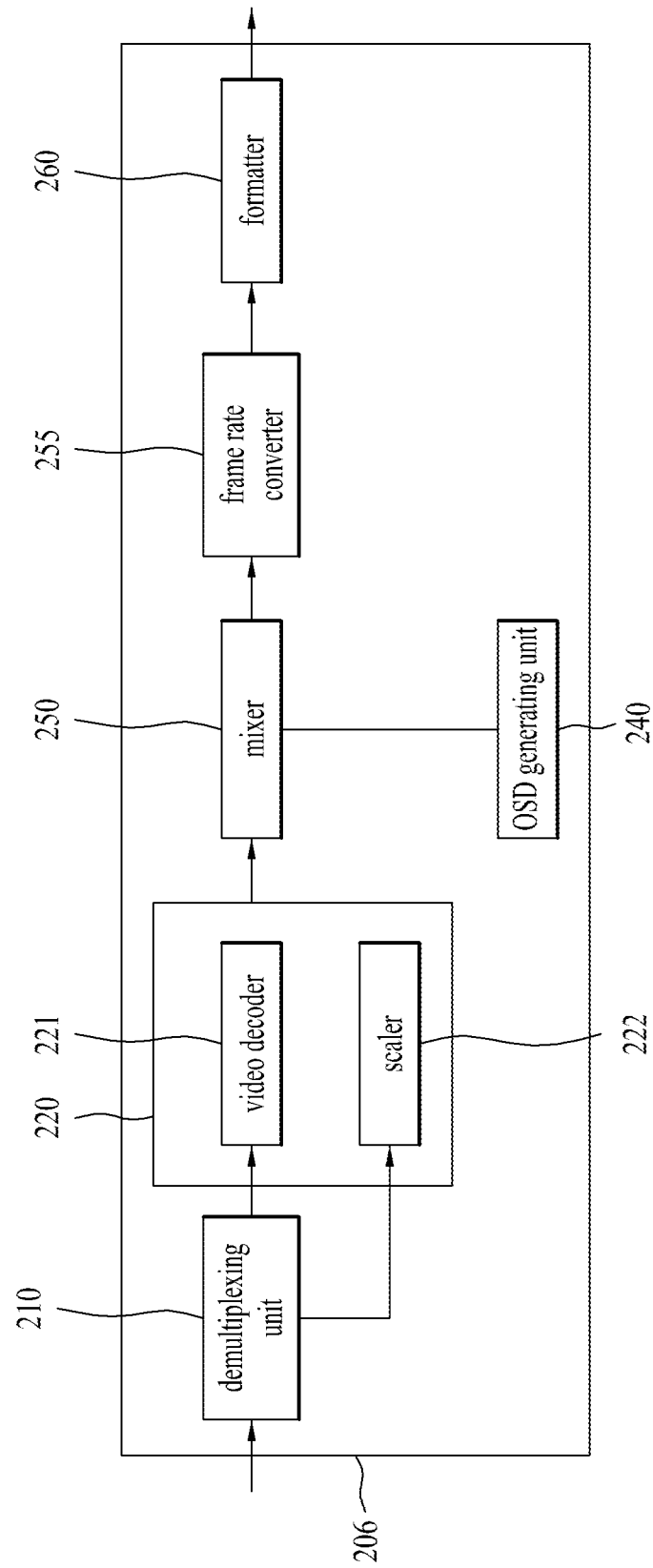
FIG. 2 is a detail block diagram for a control unit depicted in FIG. 1.

FIG. 2 is a more detail block diagram for a control unit depicted in FIG. 1. As depicted in FIG. 2, the control unit 206 of the display device includes a demultiplexing unit 210, a video processing unit 220, an OSD generating unit 240, a mixer 250, a frame rate converter 255, a formatter 260, and the like. And, the control unit 206 can be designed to further include an audio processing unit (not depicted) and a data processing unit (not depicted).

The demultiplexing unit 210 demultiplexes an inputted stream. For instance, if MPEG-2 TS is inputted, the demultiplexing unit demultiplexes the MPEG-2 TS and may be then able to divide the MPEG-2 TS into a video, an audio, and a data signal, respectively.

The video processing unit 220 can perform a video processing for a demultiplexed video signal. To this end, the video processing unit 220 can be equipped with a video decoder 221 and a scaler 222. The video decoder 221 decodes the demultiplexed video signal and the scaler 222 performs scaling to enable the video output unit to output resolution of the decoded video signal. The video signal decoded in the video processing unit 220 is inputted to the mixer 250.

The OSD generating unit 240 generates an OSD signal according to a user input or by itself. Hence, the mixer 250 can mix the OSD signal generated by the OSD generating unit 240 and the decoded video signal, which is video-processed in the video processing unit 220. The mixed signal is provided to the formatter 260. When the decoded broadcast video signal or an external input signal is mixed with the OSD signal, an OSD can be displayed on a broadcast video or an external input video in a manner of being overlaid.

The frame rate converter (FRC) 255 can convert a frame rate of an inputted video. For instance, the frame rate converter 255 converts a frame rate of 60 Hz to a frame rate of 120 Hz or 240 Hz.

And, the formatter 260 receives an output signal of the frame rate converter 255 and outputs the signal in a manner of modifying a format of the signal to make the signal suitable for the video output unit. For instance, the formatter can output R, G, and B data signal. The R, G, and B data signal can be output as a low voltage differential signaling (LVDS) or a mini-LVDS.

Figure 3:
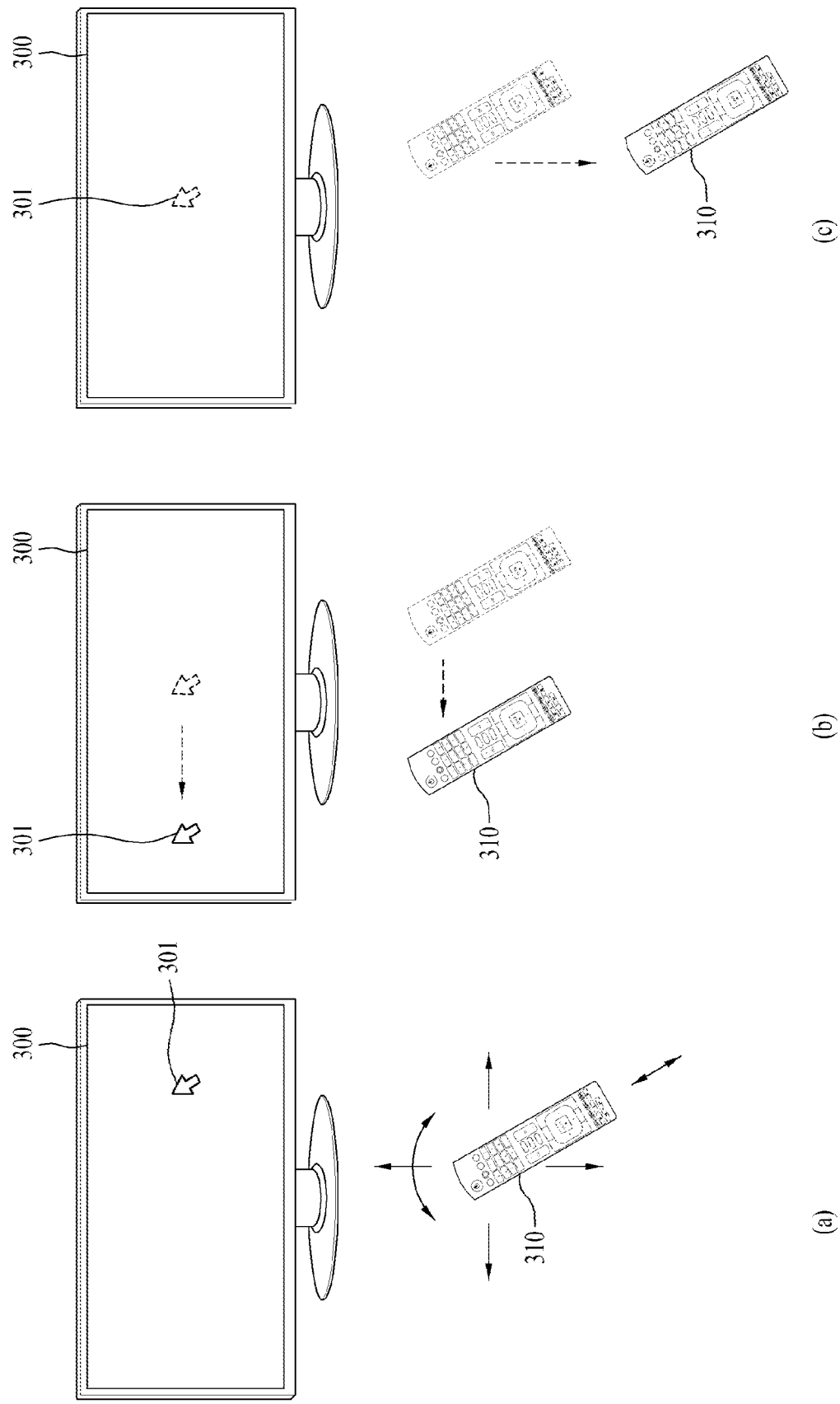
FIG. 3 is a diagram for an exterior of a remote controller according to one embodiment of the present invention.

FIG. 3 is a diagram for an exterior of a remote controller according to one embodiment of the present invention. As depicted in FIG. 3 (a), a pointer 301, which corresponds to a movement of a remote controller 310, is displayed on a screen of a display device 300. A user can move the remote controller 310 left and right (FIG. 3 (b)) and top and bottom (FIG. 3 (c)) or rotate the remote controller. Since the pointer 301 is displayed on the screen according to the movement of the remote controller in a 3D space, the remote controller 310 may be named as a space remote controller. As depicted in FIG. 3 (b), when a user moves the remote controller 310 to the left, the pointer 301 displayed on the screen of the display device 300 moves to the left as well. Meanwhile, information on the movement of the remote controller 310 detected by a sensor of the remote controller 310 is transmitted to the display device 300. The digital display device 300 can calculate a coordinate of the pointer 301 from the information on the movement of the remote controller 310. The display device 300 is designed to display the pointer 301 corresponding to the calculated coordination. Meanwhile, as depicted in FIG. 3 (c), when a user moves the remote controller 310 to the bottom, the pointer 301 displayed on the screen of the display device 300 moves to the bottom as well. Hence, a specific area within the screen of the display device 300 can be promptly selected by a user using the remote controller 310 according to one embodiment of the present invention.

Figure 4:
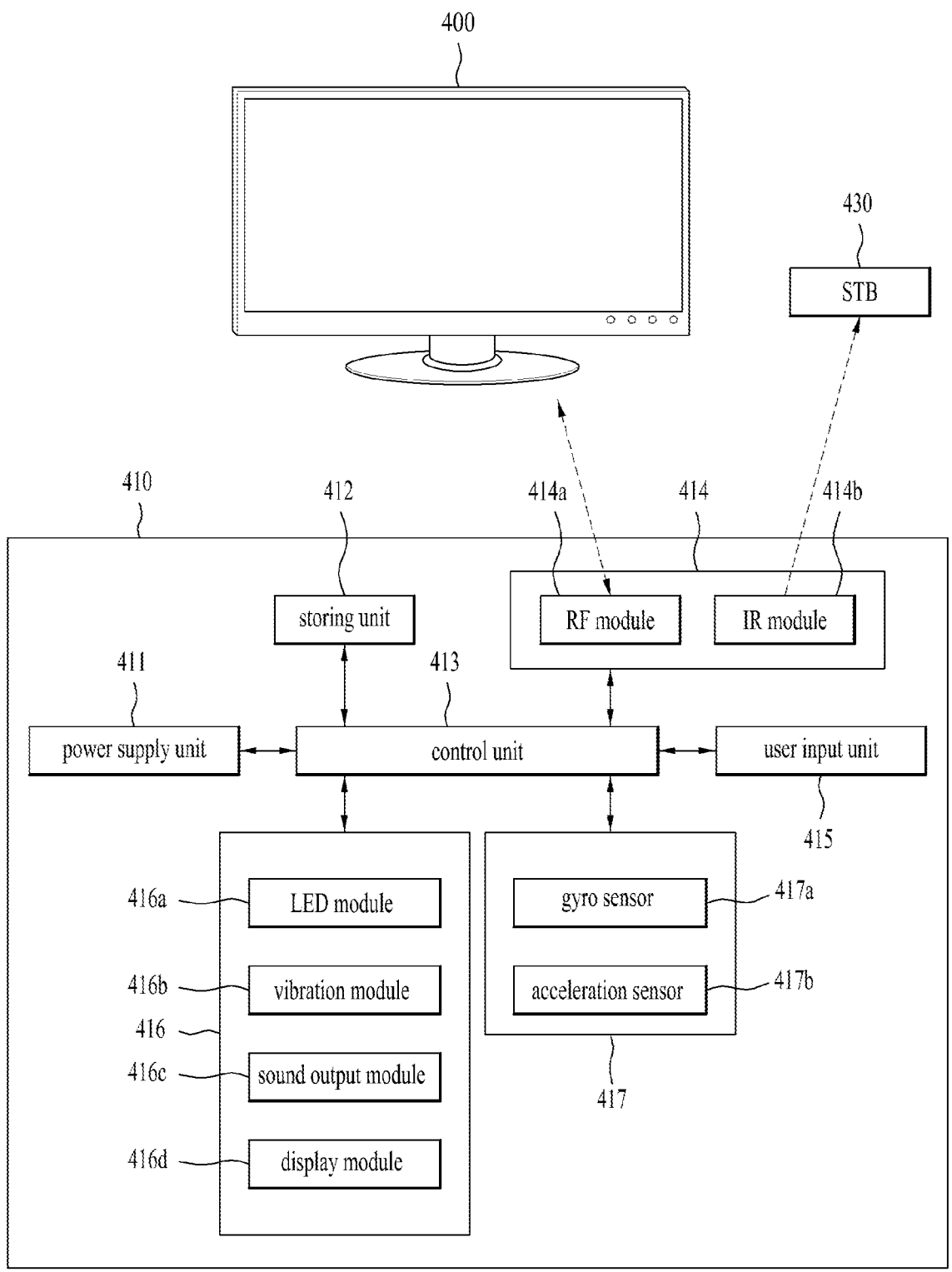
FIG. 4 is a detail block diagram for components of a remote controller depicted in FIG. 3.

FIG. 4 is a detail block diagram for components of a remote controller depicted in FIG. 3. As depicted in FIG. 4, a remote controller 410 includes a radio communication unit 414, a user input unit 415, a sensor unit 417, an output unit 416, a power supply unit 411, a storing unit 412, a control unit 413, and the like.

The radio communication unit 414 is designed to enable a communication to be performed with a random external device. In particular, according to one embodiment of the present invention, an RF module 414a is designed to perform a data communication with the display device 400 and an IR module 414b is designed to perform an infrared-ray communication with an external electronic device 430 (e.g., STB). Hence, it is possible to make the remote controller 410 play a role of a relay, which forwards an IR infrared code value received from the display device 400 to the STB 430. Moreover, according to one embodiment of the present invention, the remote controller 410 transmits a signal including information on the movement of the remote controller 410 and the like to the display device 400 via the RF module 414a. And, the remote controller 410 can receive a signal transmitted by the display device 400 via the RF module 414a. The remote controller 410 can transmit a command on power on/off, channel change, volume adjustment and the like to the display device 400 via the IR module 414b if necessary.

The user input unit 415 consists of a key pad, a button, a touch pad, a touch screen, and the like.

The sensor unit 417 can be equipped with a gyro sensor 417a or an acceleration sensor 417b. The gyro sensor 417a can sense information on a movement of the remote controller 410. As an example, the gyro sensor 417a can sense the information on the movement of the remote controller 410 on the basis of x, y, and z axis. The acceleration sensor 417b can sense information on a moving speed of the remote controller 410 and the like. Meanwhile, the sensor unit 417 may be further equipped with a distance measuring sensor. The distance measuring sensor can sense a distance between the display device 400 and the remote controller.

The output unit 416 can output a video or an audio signal corresponding to an operation of the user input unit 415 or a signal transmitted by the display device 400. As an example, the output unit 416 can be equipped with a LED module, which is lighted when the user input unit 415 is operated or a signal is transceived with the display device via the radio communication unit 414, a vibration module 416b generating a vibration, a sound output module 416c outputting a sound, or a display module 416d outputting a video.

The power supply unit 411 supplies power to each component of the remote controller 410. If the remote controller 410 does not move for a prescribed time, the power supply unit 411 stops supplying the power to the remote controller, thereby reducing power waste.

The storing unit 412 can store a program, an application data, and the like of various types necessary to control or operate the remote controller 410. And, the control unit 413 controls various matters related to a control of the remote controller 410. For instance, the control unit 413 can transmit a signal corresponding to a prescribed key operation of the user input unit 415 or a signal corresponding to a movement of the remote controller 410 sensed by the sensor unit 417 to the display device 400 or the STB via the radio communication unit 414.

Figure 5:
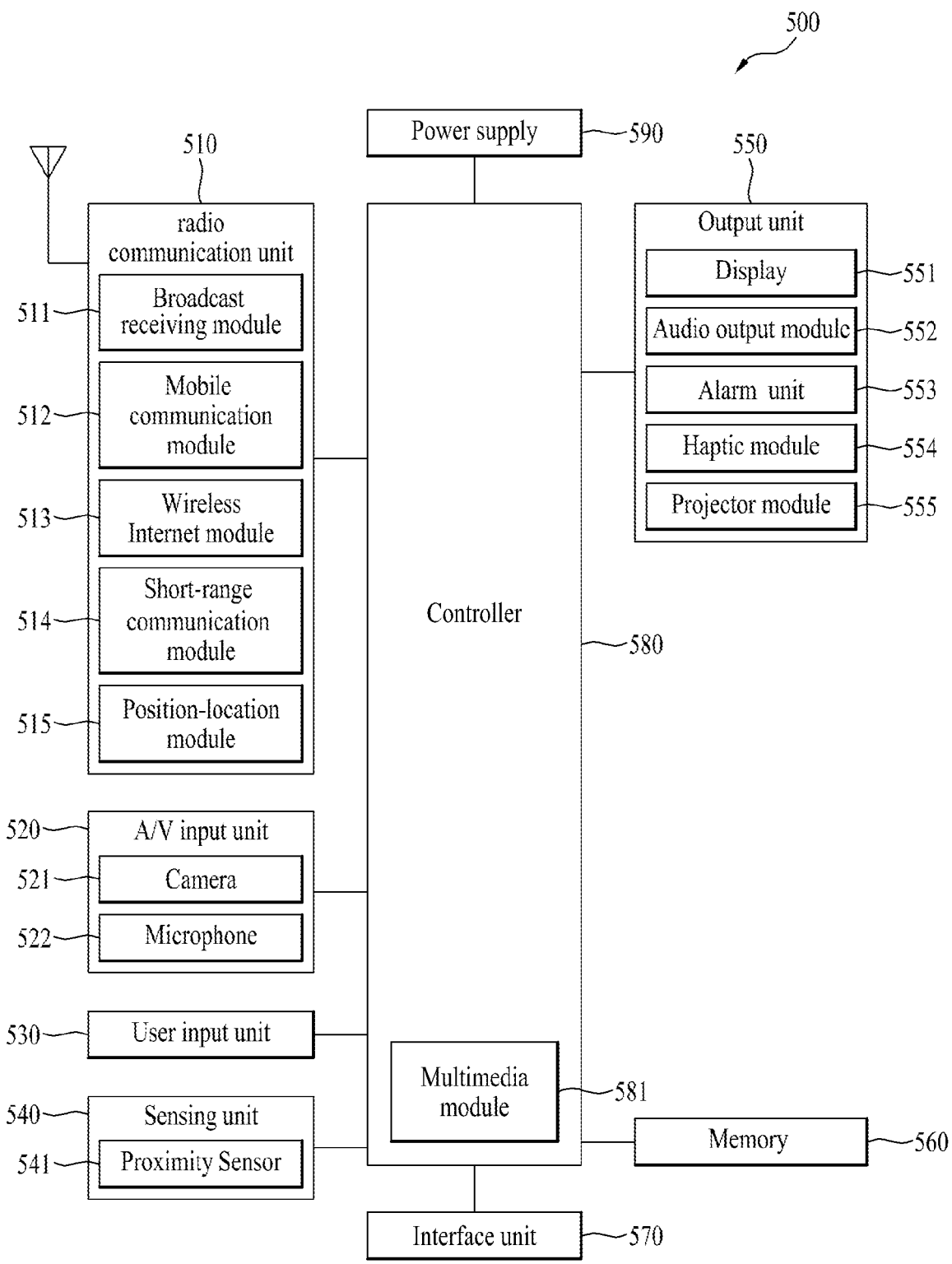
FIG. 5 is a detail block diagram for a configuration module of a display device according to a different embodiment of the present invention.

FIG. 5 is a detail block diagram for a configuration module of a display device according to a different embodiment of the present invention. The display device according to a different embodiment of the present invention includes a radio communication unit 510, an A/V (audio/video) input unit 520, a user input unit 530, a sensing unit 540, an output unit 550, a memory 560, an interface unit 570, a control unit 580, a power supply unit 590, and the like. Since the configuration elements depicted in FIG. 5 are not mandatory, the display device 500 can be implemented in a manner of including more configuration elements or less configuration elements.

The radio communication unit 510 can include at least one module enabling a radio communication to be performed between the display device 500 and a radio communication system or between the display device 500 and a network at which a different display device is positioned. For instance, the radio communication unit 510 can include a broadcast reception module 511, a mobile communication module 512, a wireless internet module 513, a short range communication module 514, a location information module 515, and the like.

The broadcast reception module 511 receives a broadcast signal and broadcast-related information from an external broadcast management server on a broadcast channel. The broadcast channel may include a satellite channel and a terrestrial channel. The broadcast management server may mean a server for generating and transmitting the broadcast signal and/or the broadcast-related information or a server for transmitting a pre-generated broadcast signal and/or broadcast-related information to a device in a manner of being provided with the pre-generated broadcast signal and/or the broadcast-related information. The broadcast signal can include a form of a broadcast signal that a data broadcast signal is combined with a TV broadcast signal or a radio broadcast signal as well as the TV broadcast signal, the radio broadcast signal, and the data broadcast signal. The broadcast-related information may mean information on a broadcast channel, a broadcast program, or a broadcast service provider. The broadcast-related information can be provided via a mobile communication network. In this case, the broadcast-related information can be received via the mobile communication module 512. The broadcast-related information may exist in various forms. For instance, the broadcast-related information may exist in such a form as an EPG (electronic program guide) of DMB (digital multimedia broadcasting) or an ESG (electronic program guide) of DMB-H (digital multimedia broadcast-handheld), or the like. For instance, the broadcast reception module 511 can receive a digital broadcast signal using such a digital broadcast system as DMB-T (digital multimedia broadcasting-terrestrial), DMB-S (digital multimedia broadcasting-satellite), MediaFLO (media forward link only), DVB-H (digital video broadcast-handheld), ISDB-T (integrated services digital broadcast-terrestrial), and the like. Of course, the broadcast reception module 511 can be configured to be suitable for a different broadcast system as well as the aforementioned digital broadcast system. The broadcast signal and the broadcast-related information received via the broadcast reception module 511 can be stored in the memory 560.

The mobile communication module 512 transceives a radio signal with at least one selected from the group consisting of a base station, an external user equipment, and a server on a mobile communication network. The radio signal can include data of various forms according to transmission and reception of an audio call signal, a video call signal, or a text/multimedia message.

The wireless internet module 513 indicates a module used for a wireless internet access and can be installed inside of the display device or outside of the display device. As a wireless internet technology, WLAN (wireless LAN) (WiFi), Wibro (wireless broadband), Wimax (world interoperability for microwave access), HSDPA (high speed downlink packet access), and the like can be used.

The short range communication module 514 indicates a module used for a short range communication. As a short range communication technology, Bluetooth, RFID (radio frequency identification), IrDA (infrared data association), UWB (ultra wideband), ZigBee, and the like can be used.

The location information module 515 is a module used for obtaining a location of the display device 500. A representative example of the location information module may correspond to a GPS (global position system).

Referring to FIG. 5, the A/V (audio/video) input unit 520 is used for inputting an audio signal or a video signal and may include a camera 512, a microphone 522, and the like. The camera 521 processes such a video frame as a still image, a video, or the like obtained by an image sensor in a video call mode or a camera mode. A processed video frame can be displayed in the display unit 551.

The video frame processed by the camera 521 is stored in the memory 560 or can be transmitted to external via the radio communication unit 510. Depending on environment of use, two or more cameras can be installed in the display device.

The microphone 522 receives an input of an external audio signal by a microphone in a calling mode, a recording mode, an audio recognition mode, or the like and processes the audio signal to an electronic audio data. In case of the calling mode, the processed audio data can be output in a manner of being converted to a form capable of being transmitted to a mobile communication base station via the mobile communication module 512. Various noise elimination algorithms can be implemented for the microphone 522 to eliminate noise occurred in a process of receiving the input of the external audio signal.

The user input unit 530 generates an input data necessary for a user to control an operation of the display device 500. The user input unit 530 can consist of a key pad, a dome switch, a touch pad (resistive/capacitive), a jog wheel, a jog switch, and the like.

The sensing unit 540 detects such a current state of the display device 500 as an open/close state of the display device 500, a location of the display device 500, whether there exist a user touch on the display device, a bearing of the display device 500, acceleration/deceleration of the display device 500, and the like and generates a sensing signal to control an operation of the display device 500. For instance, if the display device 500 has a form of a slide phone, the sensing unit can sense whether the slide phone is opened or closed. And, the sensing unit can sense whether the power supply unit 590 supplies power, whether the interface unit 570 combines with an external device, and the like. Meanwhile, the sensing unit 540 may include a proximity sensor 541.

The output unit 550 is a unit used for generating an output related to a sense of sight, a sense of hearing, a sense of touch, or the like. The output unit may include a display unit 551, a sound output module 552, an alarm unit 553, a haptic module 554, and the like.

The display unit 551 displays (outputs) information processed in the display device 500. For instance, in case of a calling mode of the display device 500, the display unit displays a UI (user interface) or a GUI (graphic user interface) related to a call. In case of a video call mode or a camera mode of the display device 500, the display unit displays a captured/received image, the UI, or the GUI. The display unit 551 can include at least one selected from the group consisting of a liquid crystal display (LCD), a thin film transistor-liquid crystal display (TFT LCD), an organic light-emitting diode (OLED), a flexible display, and a 3D display. Among the aforementioned displays, a part of the displays can be configured by a transparent or a light penetrating display to see an external via the part of the displays. This can be named a transparent display. As a representative example of the transparent display, there exists a TOLED (transparent OLED). A rear structure of the display unit 551 can also be configured by a light penetrating structure. By means of the light penetrating structure, a user can see an object positioned at the rear of a device body via a region possessed by the display unit 551 of the device body.

Depending on an implementation form of the display device 500, there may exist two or more display units 551. For instance, a plurality of display units can be separated or arranged as one body in one side of the display device 500. Or, a plurality of the display units can be arranged in each side different from each other of the display device, respectively.

In case that the display unit 551 and a sensor (hereinafter called a touch sensor) for detecting a touch operation form a layer structure with each other (hereinafter called a touch screen), the display unit 551 can be used as an input device as well as an output device. For instance, the touch sensor may have a form of a touch film, a touch sheet, a touch pad, or the like.

The touch sensor can be configured to convert a pressure put on a specific area of the display unit 551 or a change of capacitance and the like occurred on a specific area of the display unit 551 into an electrical input signal. The touch sensor can be configured to detect even a pressure as well as a position and area when a touch is performed. In case that there exists a touch input on a touch sensor, a corresponding signal (s) is transmitted to a touch controller. The touch controller processes the signal (s) and then transmits a corresponding data to the control unit 580. By doing so, the control unit 580 becomes aware of whether a certain area of the display unit 551 is touched or not. Referring to FIG. 5, a proximity sensor 541 can be arranged in the internal area of the display device 500, which is wrapped up by the touch screen, or in the vicinity of the touch screen. The proximity sensor indicates a sensor detecting whether an object approaching to a prescribed detecting side or an object existing near the proximity sensor exists using power of electromagnetic field or an infrared light without a mechanical contact. The proximity sensor has a longer life than a contact sensor and its utilization is higher as well. An example of the proximity sensor may include a through-beam photo sensor, a diffuse reflection photo sensor, a retro-reflective photo sensor, a high-frequency oscillation-type proximity sensor, a capacitive proximity sensor, a magnetic proximity sensor, an infrared proximity sensor, and the like. In case that the touch screen corresponds to a capacitive proximity sensor, the touch screen is configured to detect an approach of a pointer using a change of an electric field according to the approach of the pointer. In this case, the touch screen (touch sensor) may be classified into a proximity sensor.

The sound output module 552 may be able to output an audio data received by the radio communication unit 510 in a calling mode, a recording mode, a voice recognition mode, a broadcast receiving mode, or the like or stored in the memory 560. The sound output module 552 may be able to output a sound signal related to a function (e.g., a message reception sound, and the like) performed in the display device 500. The sound output module 552 may include a receiver, a speaker, a buzzer, and the like.

The alarm unit 553 outputs a signal to alarm an occurrence of an event of the display device 500. An example of the event occurred in the display device 500 may include a message reception, key signal input, a touch input, and the like. The alarm unit 553 may be able to output a signal to alarm an occurrence of an event by a different form (e.g., vibration) besides a video signal or an audio signal. Since the video signal or the audio signal can be output by the display 551 or the sound output module 552, the display unit and the sound output module 551/552 can be classified into a part of the alarm unit 553.

The haptic module 554 generates a various kind of haptic effects capable of being felt by a user. A representative example of the haptic effects generated by the haptic module 554 is a vibration. The strength, pattern, and the like of the vibration generated by the haptic module 554 can be controlled. For instance, a vibration can be output in a manner of combining vibrations different from each other or can be sequentially output.

Besides the vibration, the haptic module 554 may be able to generate such a various haptic effects as a pin arrangement performing a vertical movement for a contacted skin side, jet force or suction force of air via a nozzle or an intake, a brush for a skin surface, a contact of an electrode, an effect by a stimulus such as electrostatic power and the like, an effect generated by reproducing the sense of heat or cold using an element capable of absorbing or producing heat. The haptic module 554 may be able to deliver a haptic effect by a direct touch. Moreover, the haptic module may be implemented to feel a haptic effect via a muscle sense such as a finger, an arm, or the like. Two or more haptic modules 554 can be installed in the display device 500 according to a configuration of the display device 100.

The memory 560 can store a program for an operation of the control unit 580 and may be able to temporarily store input/output data (e.g., a message, a still image, a video, and the like). The memory 560 may be able to store data on vibrations of various patterns and sounds output in case that a touch is inputted on the touch screen. The memory 560 may be able to include at least one type of recording media among a flash memory type, a hard disk type, a multimedia card micro type, a card type memory (e.g., SD or XD memory, and the like), a RAM (random access memory), an SRAM (static random access memory), a ROM (read-only memory), an EEPROM (electrically erasable programmable read-only memory), a PROM (programmable read-only memory), a magnetic memory, a magnetic disk, and an optical disk. The display device 500 may operate in relation to a web storage, which performs a storing function of the memory 560 on the internet.

The interface unit 570 plays a role of a path with all external devices connected to the display device 500. The interface unit 570 receives data from an external device, delivers power to each of the internal configuration elements of the display device 500, or enables internal data of the display device 500 to be transmitted to the external device. For instance, the interface unit 570 may include a wired/wireless headset port, an external charger port, a wired/wireless data port, a memory card port, a port connecting a device equipped with an identification module, an audio I/O (input/output) port, a video I/O (input/output) port, an earphone port, and the like.

The identification module corresponds to a chip storing various informations to authenticate the use authority of the display device 500. The identification module may include a user identification module (UIM), a subscriber identification module (SIM), an universal subscriber identification module (USIM), and the like. A device equipped with the identification module (hereinafter abbreviated an identification device) can be manufactured in a form of a smart card. Hence, the identification device can be connected to the display device 500 via a port.

In case that the display device 500 is connected to an external cradle, the interface unit 570 can be a path for receiving power from the cradle to supply power to the display device 500 or can be a path for delivering various command signals inputted by a user from the cradle to the display device 500. Various command signals inputted from the cradle or the power may be operated as a signal to recognize that the display device 500 is correctly installed in the cradle.

In general, the control unit 580 controls overall operations of the display device 500. For instance, the control unit performs a control and a process related to a voice call, a data communication, a video call, and the like. The control unit 580 may include a multimedia module 581 to play a multimedia. The multimedia module 581 can be implemented within the control unit 580 or can be implemented irrespective of the control unit 580. The control unit 580 can perform a pattern recognition processing capable of recognizing a hand writing input and a drawing input performed on the touch screen as a text and an image, respectively.

The power supply unit 590 supplies power necessary for an operation of each of the configuration elements in a manner of being provided with an external power or an internal power by a control of the control unit 580. Embodiments of the present invention can be implemented using various means. For instance, embodiments of the present invention can be implemented in a recording media readable by a computer or a computer like device using software, hardware, and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor, electronic unit to perform an extra function. In some cases, the embodiments of the present specification can be implemented by the control unit 580 itself.

In case of the implementation by software, the embodiments such as procedures and functions described in the present specification can be implemented by separate software modules. Each of the software modules may be able to perform at least one function or operation described in the present specification. Software code can be implemented by a software application written by an appropriate programming language. The software code is stored in the memory 560 and can be implemented by the control unit 580.

Figure 6:
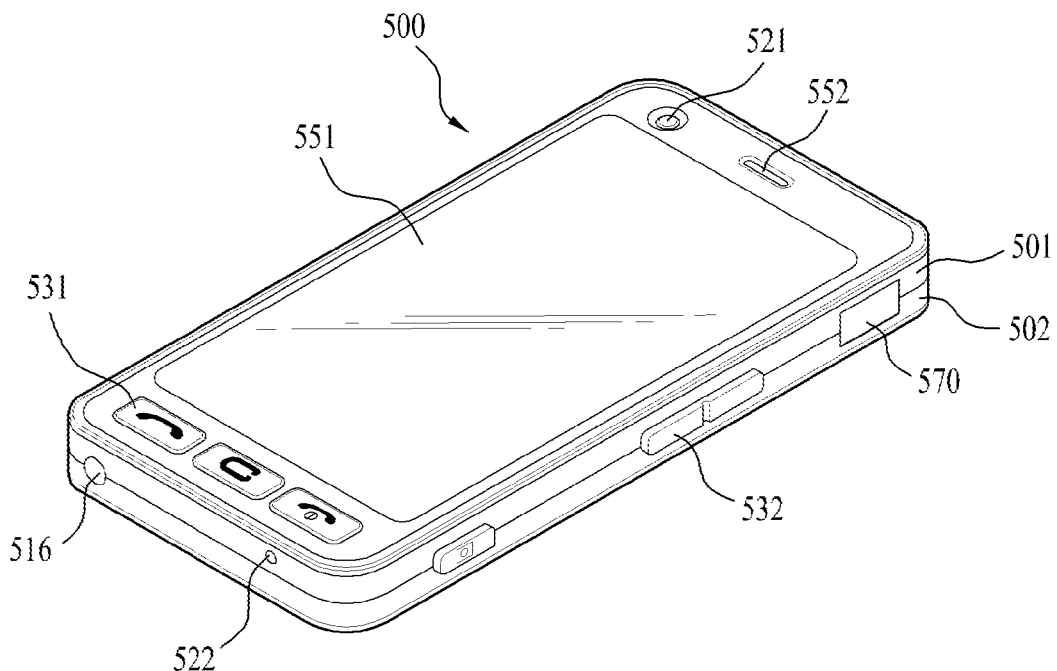
FIG. 6 is a diagram for one side among an exterior of a display device according to a different embodiment of the present invention.

FIG. 6 is a diagram for one side among an exterior of a display device according to a different embodiment of the present invention. The display device 500 depicted in FIG. 6 is equipped with a device body of a bar form. Yet, the present invention may be non-limited to the aforementioned form. The present invention may be applicable to such various structures as a slide type, a folder type, a swing type, a swivel type, and the like with which two or more bodies are combined in a manner of being relatively moved. A body includes a case (casing, housing, cover, and the like) forming an exterior. According to the present embodiment, the case can be classified into a front case 501 and a rear case 502. A space formed between the front 501 and the rear case 502 is equipped with various kinds of electronic components. At least one middle case can be additionally arranged between the front 501 and the rear case 502. Cases are formed by shooting out synthetic resins or may be formed to have such a metallic material as stainless steel (STS), titanium (Ti), or the like. In the device body, specifically, in the front case 501, it may arrange a display unit 551, a sound output module 552, a camera 521, a user input unit 530/531/532, a microphone 522, an interface unit 570, and the like.

The display unit 551 occupies most of a main side of the front case 501. Among both ends of the display unit 551, the sound output module 552 and the camera 521 are arranged in an area adjacent to one of the both ends. And, the user input unit 531 and the microphone 522 are arranged in an area adjacent to another end of the both ends. The user input unit 532, the interface unit 570, and the like can be arranged in sides of both the front 501 and the rear case 502.

The user input unit 530 is manipulated to receive an input of a command for controlling an operation of the display device 500 and may include plurality of manipulation units 531/532. The manipulation units 531/532 may be commonly called a manipulating portion as well. If a scheme of manipulating the display device corresponds to a scheme for a user to manipulate the display device in a tactile manner, any scheme could be adopted.

Contents inputted by a first 531 or a second manipulation unit 532 can be configured in various ways. For instance, the first manipulation unit 531 receives such a command input as start, end, scroll, and the like and the second manipulation unit 532 may receive such a command input as volume adjustment of sound output from the sound output module 552, switching to a touch recognition mode of the display unit 551, or the like.

Figure 7:
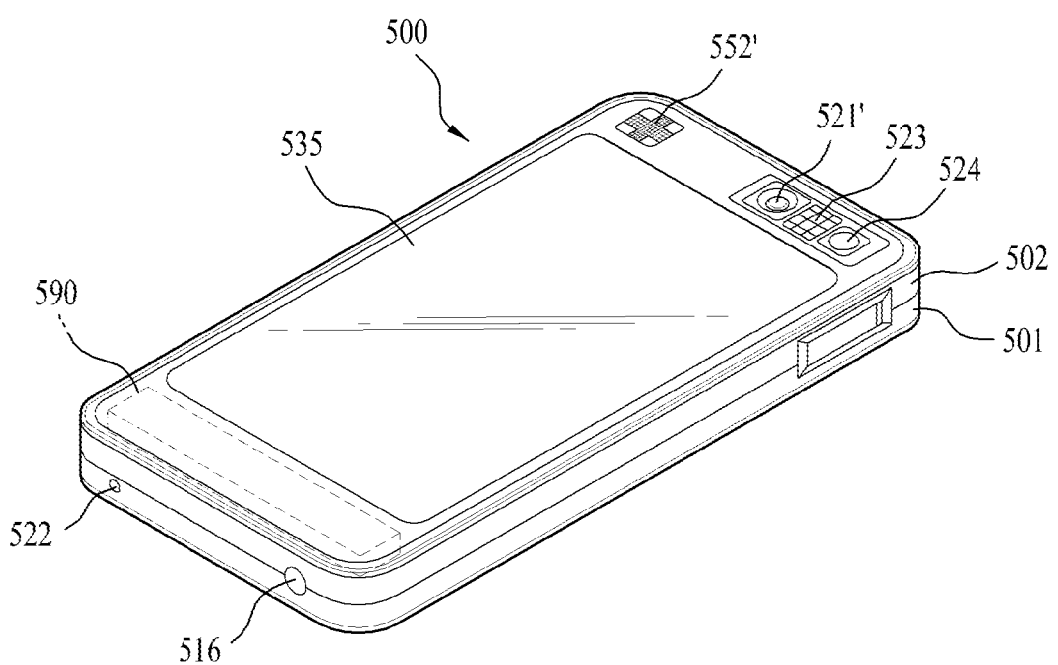
FIG. 7 is a diagram for another side among an exterior of a display device according to a different embodiment of the present invention.

FIG. 7 is a diagram for another side among an exterior of a display device according to a different embodiment of the present invention. As depicted in FIG. 7, a camera 521' can be additionally installed in a rear side of a body of the display device 500, i.e., a rear case 502. The camera 521' has a photographing direction practically opposite to that of the camera 521 (refer to FIG. 6), The camera 521' may correspond to a camera different from the camera 521 in pixels. For instance, the camera 521 may have a low pixel in order not to overtax in case of transmitting a picture of a user to a counterpart in a manner of taking a picture of the user when a video call or the like is performed. On the other hand, since the camera 521' takes a picture of a general subject and may not immediately transmit the picture in general, it is preferable to have a high pixel. The camera 521/521' can be installed in the device body in a manner that the camera is capable of rotating or popping-up. A flash 523 and a mirror 524 are additionally arranged in the vicinity of the camera 521'. The flash 523 flashes light to a subject in case that the camera 521' takes a picture of the subject. The mirror 524 makes a user look at a face and the like of the user in case of taking picture of the user (taking a picture of oneself) using the camera 521'.

A sound output unit 552' may be additionally arranged in the rear side of the device body. The sound output unit 552' can implement a stereo function together with the sound output unit 552 and may be used to implement a speakerphone mode in case of making a call.

An antenna 516 used for receiving a broadcast signal as well as an antenna used for making a call and the like can be additionally arranged in a side of the device body. The antenna, which forms a part of the broadcast reception module 511, can be installed in the device body in a manner of being pulled out from the device body.

The device body is equipped with a power supply unit 590 to supply power to the display device 500. The power supply unit 590 may be installed inside of the device body or can be configured to be directly detached/attached from the outside of the device body.

The rear case 502 can be additionally equipped with a touch pad 535 to detect a touch. Similar to the display unit 551, the touch pad 535 can also be configured as a light penetrating unit. In this case, if the display unit 551 is configured to output visual information at both sides, the visual information can be recognized via the touch pad 535 as well. All of the information output from the both sides may be controlled by the touch pad 535. On the contrary, the touch pad 535 is additionally equipped with a display and then a touch screen may be installed in the rear case as well.

Figure 8:
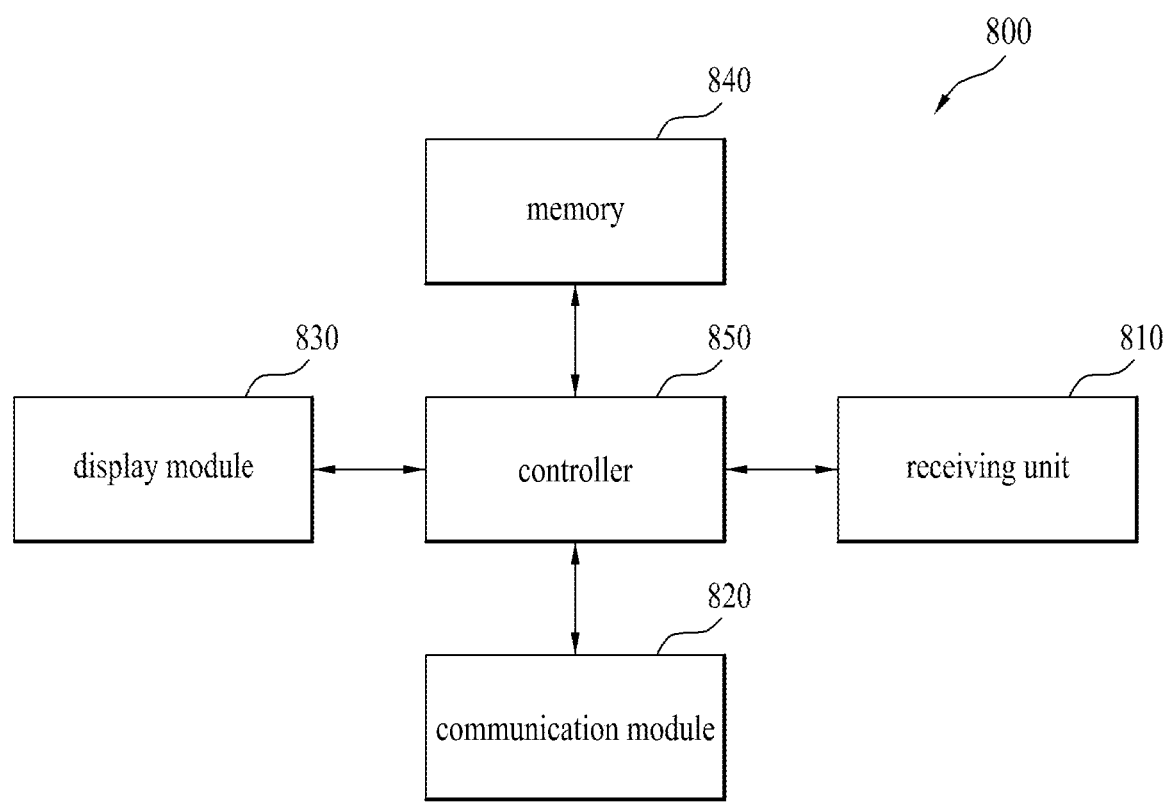
FIG. 8 is a detail diagram for configuration modules of a display device according to a further different embodiment of the present invention.

FIG. 8 is a detailed block diagram for configuration modules of the display device according to a further different embodiment of the present invention. A part of the modules of the display device depicted in FIG. 8 can be added or modified with reference to the aforementioned FIG. 1 to FIG. 7. Basically, the scope of right of the present invention should be comprehended according to the items written in the claims instead of determining by the elements shown in FIG. 1 to FIG. 8. As depicted in FIG. 8, the display device 800 according to a further different embodiment of the present invention includes a reception unit 810, a communication module 820, a display module 830, a memory 840, a controller 850, and the like.

The reception unit 810 can receive a channel change signal from an external input means. The external input means may correspond to the remote controller mentioned earlier in FIG. 3 to FIG. 4. And, the external input means may correspond to a mobile device or a keyboard. The channel change signal can be received via such various communication schemes as an RF communication scheme, an infrared (IR) communication scheme, and the like. And, the external input means can transceive data with the display device in a manner of being paired with the display device. The reception unit 810 may correspond to the user interface unit 111 mentioned earlier in FIG. 1.

The communication module 820 can perform a data communication with an external server. The data communication can be performed by a wired/wireless network scheme. The external server may correspond to a server configured to store viewer ratings of a broadcast channel in a manner of performing real time update. The communication module 820 may correspond to the network interface unit 103 mentioned earlier in FIG. 1.

The display module 830 can output a channel banner list of a broadcast program and broadcast channels in a screen. The display module 830 may correspond to the display unit 551 mentioned earlier in FIG. 5.

The memory 840 can store a viewing history data of a user. The viewing history data of the user may include information on the number of accesses per a channel number accessed within a predetermined time period, a last watching date, watching time, and priority. And, the memory 840 can be equipped with a data base to store the viewing history data of the user. The memory 840 may correspond to the memory mentioned earlier in FIG. 1.

The controller 850 performs a function of managing overall functions of one or more modules depicted in FIG. 8 such as the reception unit 810, the communication module 820, the display module 830, the memory 840, and the like. Regarding this, it shall be described in more detail with reference to FIG. 9 to FIG. 21.

Figure 9:
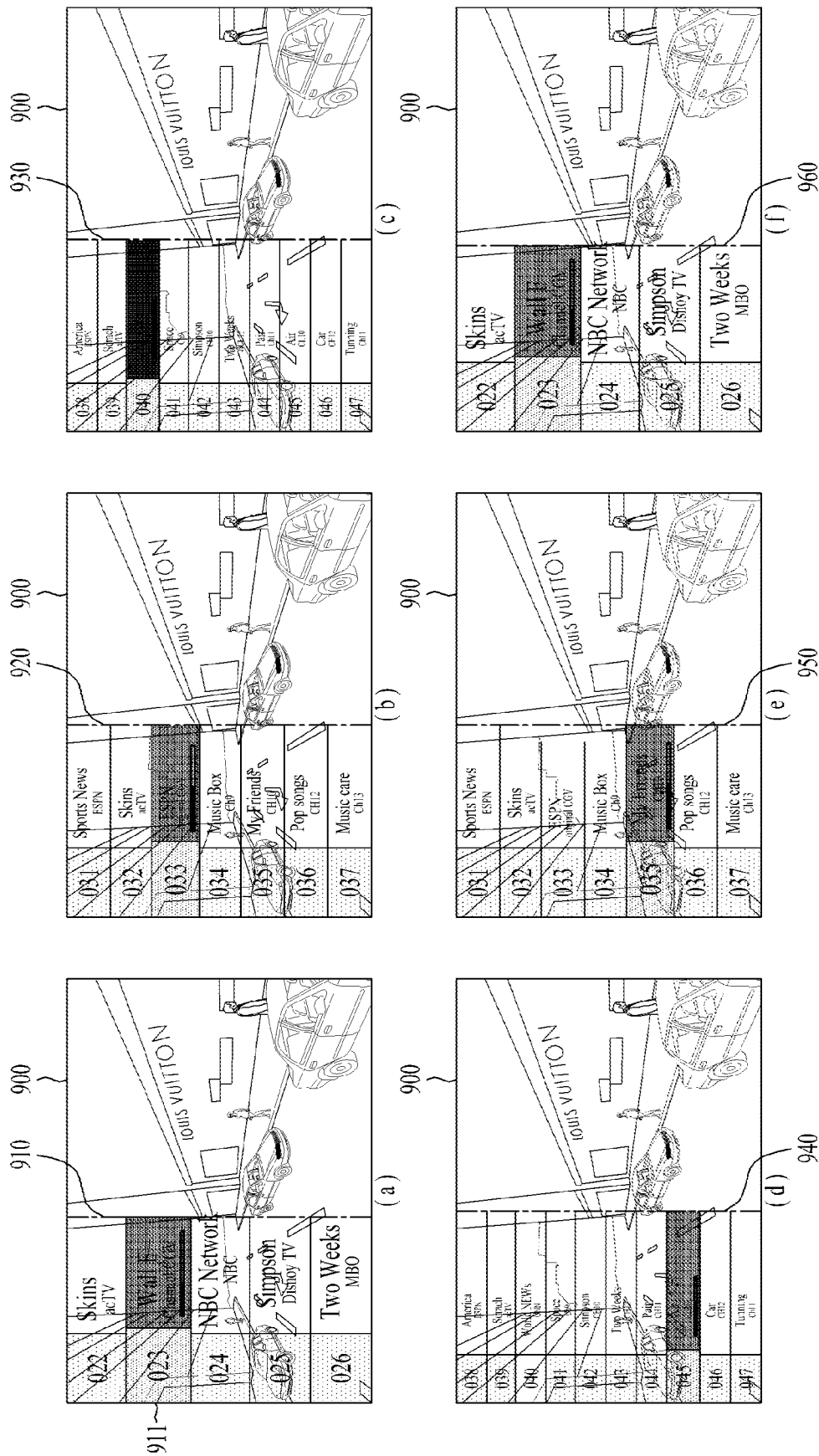
FIG. 9 is a diagram for explaining an example for a display device according to one embodiment of the present invention to receive a channel change signal and change a size of a channel banner.

FIG. 9 is a diagram for explaining an example for a display device according to one embodiment to receive a channel change signal and change a size of a channel banner.

A controller of the display device according to one embodiment of the present invention may control a first broadcast channel banner list 910/940, which includes a channel banner of broadcast channels received by the display device 900, to be output in a screen, a channel change signal to be received more than one time within a predetermined time, and a second broadcast channel banner list 920/950, which has changed a size of the channel banner of the channels included in the first broadcast channel banner list 910/940, to be output in the screen.

The channel banner can include a broadcast channel number, title information of a broadcast program, and a progress-bar GUI of the broadcast program.

As depicted in FIG. 9 (*a*), the controller of the display device 900 according to one embodiment of the present invention can control a first broadcast channel banner list 910 including a channel banner of broadcast channels to be output in a screen. In case of initially outputting the first broadcast channel banner list 910, a channel banner 911 corresponding to a broadcast channel currently output in the screen can be displayed in a manner of being highlighted. And, a position of the currently selected channel banner within the first broadcast channel banner list 910 can be determined by a position capable of implying a position of the currently selected channel banner among the total channel banner lists. For instance, if the number of broadcast channels received by the display device 900 correspond to 100 and the currently selected broadcast channel corresponds to a $50^{th}$ channel, the channel banner of the currently selected broadcast channel can be displayed in a middle position of the channel banner list. And, as depicted in FIG. 9 (*b*), if a first channel change signal, which increases the channel number, is received more than a first number within a predetermined time period, the controller of the display device 900 generates a second broadcast channel banner list 920 in a manner of reducing the size of the channel banner of the channels included in the first broadcast channel banner list 910 and can control the second broadcast channel banner list to be output in the screen. The predetermined time period and the first number are default values and may be set to three seconds and 5 times, respectively. The default values may be modified by a user. Moreover, as depicted in FIG. 9 (*c*), if the first channel change signal, which increases the channel number, is further received more than the first number within the predetermined time period followed by FIG. 9 (*b*), the controller of the display device 900 generates a third broadcast channel banner list 930 in a manner of further reducing the size of the channel banner of the channels included in the second broadcast channel banner list 920 and can control the third broadcast channel banner list to be output in the screen.

Moreover, the size of the channel banner can be enlarged. For instance, as depicted in FIG. 9 (*d*), the controller of the display device 900 according to one embodiment of the present invention can control a first broadcast channel banner list 940 including the channel banner of the broadcast channels to be output in the screen. And, as depicted in FIG. 9 (*e*), if a second channel change signal, which decreases the channel number, is received less than the first number within a predetermined time period, the controller of the display device 900 generates a second broadcast channel banner list 950 in a manner of enlarging the size of the channel banner of the channels included in the first broadcast channel banner list 940 and can control the second broadcast channel banner list to be output in the screen. Moreover, as depicted in FIG. 9 (*f*), if the second channel change signal, which decreases the channel number, is received less than first number within the predetermined time period after FIG. 9 (*e*), the controller of the display device 900 generates a third broadcast channel banner list 960 in a manner of further enlarging the size of the channel banner of the channels included in the second broadcast channel banner list 950 and can control the third broadcast channel banner list to be output in the screen.

By designing the display device as above-mentioned, a user can perform a channel search more quickly in an era of digital broadcasting where a large number of channels exist.

FIG. 10 is a diagram for explaining an example for a display device according to one embodiment of the present invention to determine an output position of a channel banner using ACR.

As depicted in FIG. 10, a display device 1000 according to one embodiment of the present invention can automatically determine a position of a channel banner using an ACR (automatic content recognition) technology. A controller of the display device 1000 according to one embodiment of the present invention can control an output position of a channel banner 1020 to be determined on the basis of output positions of a program logo 1030 and a broadcast company logo 1040. For instance, as depicted in FIG. 10 (*a*), as a result of performing the ACR, if there do not exist the program logo 1030 and the broadcast company logo 1040 in a picture 1010 currently output in a screen, the controller of the display device 1000 can determine as the output position of the channel banner 1020 becomes either a top left or a top right. On the contrary, as depicted in FIG. 10 (*b*), as a result of performing the ACR, if there exist the program logo 1030 and the broadcast company logo 1040 in the picture 1010 currently output in the screen, the controller of the display device 1000 can determine the output position of the channel banner 1020 by a position where the output position of the channel banner is not duplicated with the output positions of the program logo 1030 and the broadcast company logo 1040 and the position capable of being easily recognized by a user. The program logo 1030 and the broadcast company logo 1040 are just one example only. A criterion for the display device 1000 according to one embodiment of the present invention to determine the output position of the channel banner 1020 by performing the ACR may include output positions of an icon and an indicator to display additional information of all contents. If the display device is designed as mentioned in FIG. 10, when user checks additional information of contents currently displayed in a screen, the user is not impeded by a channel banner.

Figure 11:
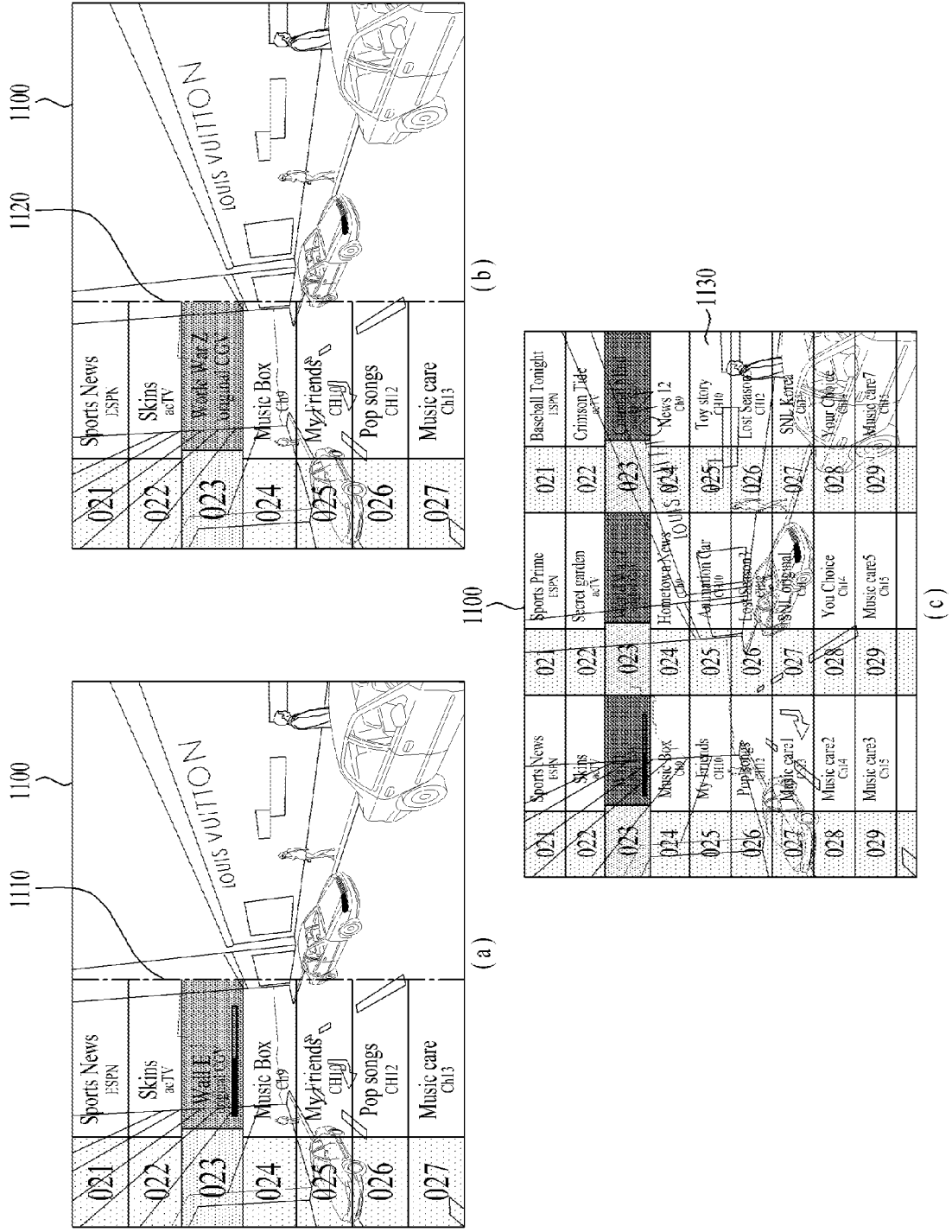
FIG. 11 is a diagram for explaining an example for a display device according to one embodiment of the present invention to output information on a program to be broadcasted via a channel banner.

FIG. 11 is a diagram for explaining an example for a display device according to one embodiment of the present invention to output information on a program to be broadcasted via a channel banner.

As depicted in FIG. 11 (*a*), the controller of the display device 1100 according to one embodiment of the present invention can control a first broadcast channel banner list 1110 including a channel banner of broadcast channels, which are received by the display device 1110, to be output in a screen. And, as depicted in FIG. 11 (*b*), if a specific function key signal is received or a broadcast channel change signal is received more than a first number within a predetermined time period, the controller of the display device 1100 can control information on a program, which will be broadcasted after a program currently broadcasting on a channel corresponding to a channel banner 1120 currently selected on the first broadcast channel banner list 1110, to be output. The specific function key signal corresponds to a key to make a request for an output of information on a broadcast program according to time for an identical channel and may correspond to a right direction key. Moreover, as depicted in FIG. 11 (*c*), if the specific function key signal is received or the broadcast channel change signal is received more than the first number within the predetermined time period, the controller of the display device 1110 generates a second broadcast channel banner list 1130 to output information on programs currently broadcasting on channels included in the first broadcast channel banner list 1110 together with information on programs to be broadcasted and may be then able to control the second broadcast channel banner list to be output in the screen. And, although it is not depicted in FIG. 11, if the specific function key signal is received, the controller of the display device according to one embodiment of the present invention can control information on a program, which has been broadcasted prior to a program currently broadcasting on a channel corresponding to the channel banner 1120 currently selected on the first broadcast channel banner list 1110, to be output in the screen. By designing the display device as above-mentioned, a user can obtain the information on the broadcast programs according to time in the channel banner list without needing to separately output an EPG (electronic program guide).

FIG. 12 is a diagram for explaining an example for a display device according to one embodiment of the present invention to provide additional information by partitioning a channel banner.

The controller of the display device 1200 according to one embodiment of the present invention can control both title information of the program currently broadcasting and title information of a program followed by the program currently broadcasting to be displayed in a channel banner 1220 when remaining broadcasting time of a program currently broadcasting is less than a predetermined time. For instance, as depicted in FIG. 12 (*a*), the controller of the display device 1200 according to one embodiment of the present invention can control a first broadcast channel banner list 1210, which includes channel banners of broadcast channels received by the display device 1200, to be output in a screen. And, the channel banner 1220 of a currently selected channel can be displayed in a manner of being highlighted. And, the channel banner 1220 can include a broadcast channel number, title information of a broadcast program, and a progress bar GUI of the broadcast program. And, the progress bar GUI can display progress situation of a program currently broadcasting. And, as depicted in FIG. 12 (*b*), when the progress situation of the program currently broadcasting is more than 50%, if a broadcast channel change signal is received more than a first number within a predetermined time period, the controller of the display device 1200 can control a channel number 1231 of a selected channel banner, title information 1232 of the program currently broadcasting, and title information 1233 of a program followed by the program currently broadcasting to be displayed in a manner of partitioning the selected channel banner 1230. Moreover, as depicted in FIG. 12 (*c*), when the progress situation of the program currently broadcasting is more than 90%, if the broadcast channel change signal is received more than the first number within the predetermined time period, the controller of the display device 1200 can control a channel number 1241 of a selected channel banner, title information 1242 of a program broadcasted prior to the program currently broadcasting, title information 1243 of the program currently broadcasting, and title information 1244 of a program followed by the program currently broadcasting to be displayed in a manner of partitioning the selected channel banner 1240. And, if the first broadcast channel banner list 1210 is output and an EPG output request signal is received, the controller of the display device 1200 can control EPG information of a broadcast channel corresponding to the channel banner output in a current screen to be output in the screen.

FIG. 13 is a diagram for explaining channel additional information included in a channel banner generated by a display device according to one embodiment of the present invention.

If a channel banner is generated, the controller of the display device according to one embodiment of the present invention can generate various channel additional information in a manner of including the various channel additional information in the channel banner. For instance, as depicted in FIG. 13 (*a*), in case of a channel banner 1310 of a movie channel, the controller of the display device can generate the channel banner in a manner of including a channel number 1311, movie title information 1312, channel title information 1313, a progress bar GUI 1314 of a movie, charge information 1315 of a movie watching service, and information 1316 on whether a user joins a charged service in the channel banner 1310 of the movie channel as the channel additional information. And, as depicted in FIG. 13 (*b*), in case of a channel banner 1320 of a drama channel, the controller of the display device can generate the channel banner in a manner of including a channel number 1321, drama title information 1322, channel title information 1323, a progress bar GUI 1324 of a drama, charge information 1325 of a drama watching service, and a record data icon 1326 in the channel banner 1320 of the drama channel as the channel additional information. Moreover, as depicted in FIG. 13 (*c*), having received a signal for selecting the record data icon 1326 of series included in the channel banner 1320 of the drama channel, the controller of the display device can control a message 1330 for checking an output request for a record data to be output in a screen. And, as depicted in FIG. 13 (*d*), if the output request signal of the record data is received via the message 1330, the controller of the display device can control a message 1340 for checking an output request for the program currently broadcasting to be output after the record data is watched. Moreover, although it is not depicted in FIG. 13, if an output request signal of the program currently broadcasting is received after a user watches the record data via the message 1340, the controller of the display device performs a recording of the program currently broadcasting and can simultaneously control record data of a previously recorded series to be output in a screen. If playback of the record data ends, the controller of the display device can control the recorded data of the program currently broadcasting to be output in succession. By designing the display device according to FIG. 13, since a user can obtain various channel additional information as well as program information of the program currently broadcasting via a channel banner, thereby increasing user convenience.

Figure 14:
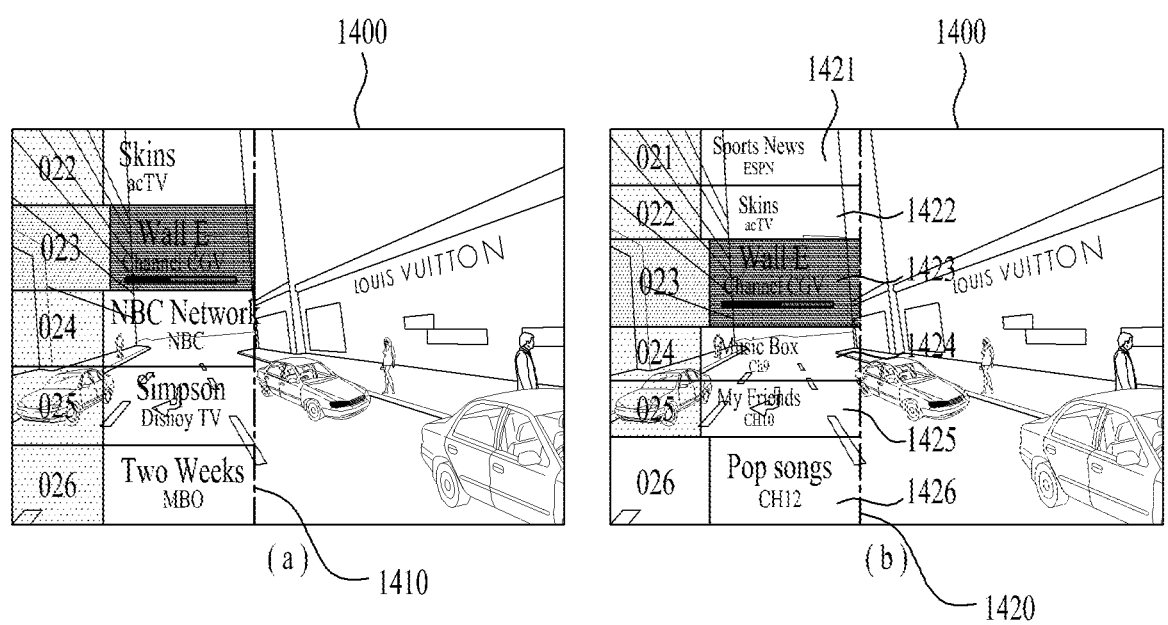
FIG. 14 is a diagram for explaining an example for a display device according to one embodiment of the present invention to adjust a size of a channel banner based on viewer ratings information.

FIG. 14 is a diagram for explaining an example for a display device according to one embodiment of the present invention to adjust a size of a channel banner based on viewer ratings information.

The controller of the display device according to one embodiment of the present invention can output a first broadcast channel banner list 1410 including channel banners of broadcast channels received by the display device 1400 in a screen, receive a channel change signal more than a first number within a predetermined time period, and control a second broadcast channel banner list, which has changed a size of the channel banners of channels included in the first broadcast channel banner list 1410, to be output in the screen. And, if the broadcast channel change signal is received more than the first number within the predetermined time, the controller receives a current viewer ratings data of the channels 1421/1422/1423/1424/1425/1426 included in the second broadcast channel banner list 1420 from an external server, determines a size of the channel banners 1421/1422/1424/1425 of the channels including the viewer ratings less than a predetermined value as a first channel banner size, and determines the size of the channel banners 1423/1426 of the channels including the viewer ratings greater than the predetermined value as a second channel banner size. By doing so, the controller can adjust the size of the channel banner of the channels included in the second broadcast channel banner list 1420. The size of the first channel banner may be smaller than the size of the second channel banner. The predetermined value corresponds to 10% as a default value and may be modified by a user. By designing the display device according to FIG. 14, a user can easily and promptly identify a channel of high viewer ratings via the size of the channel banner without checking current viewer ratings of each channel in a channel searching process.

FIG. 15 is a diagram for explaining a data base to store a viewing history data of a user in a memory of a display device according to one embodiment of the present invention.

As depicted in FIG. 15, a memory of the display device according to one embodiment of the present invention can include a database 1500 to store a viewing history data of a user. The database 1500 can store the viewing history data of the user according to channels for a predetermined time period. The viewing history data of the user according to channels for the predetermined time period can include a channel number 1510, the number of access 1520, a last watching date 1530, watching time 1540, and priority 1550 information. The channel number 1510 corresponds to a channel number of a channel received by the display device and the number of access 1520 corresponds to the number of watching a channel by a user for a predetermined time period. For instance, if an identical channel is watched more than 5 minutes, the number of access 1520 can be recognized as one time. And, the last watching date 1530 may mean a date on which a user lately watched a channel among the predetermined time period. And, the watching time 1540 may mean a total time for which a user watches a channel among the predetermined time period. The priority 1550 can be determined on the basis of at least one selected from the group consisting of the number of access 1520, the last watching date 1530, and the watching time 1540. For instance, as depicted in FIG. 15, the priority 1550 can be determined on the basis of the watching time 1540. For instance, as depicted in FIG. 15, a user may watch a first channel 1511 for the predetermined time as follows. The number of access 1521 corresponds to 2, the last watching date 1531 corresponds to Jan. 30 2013, and the watching time 1541 corresponds to 40 minutes. The user may watch a second channel 1512 as follows. The number of access 1522 corresponds to 3, the last watching date 1532 corresponds to Jan. 27 2013, and the watching time 1542 corresponds to 1 hour and 30 minutes. The user may watch a third channel 1513 as follows. The number of access 1523 corresponds to 1, the last watching date 1533 corresponds to Jan. 25 2013, and the watching time 1543 corresponds to 3 hours. And, the user may watch a fourth channel 1514 as follows. The number of access 1524 corresponds to 0 and data on the last watching date 1534 and the watching time 1544 is not recorded. And, as depicted in FIG. 15, if the channel priority is determined on the basis of the watching time 1540, the third channel 1513, the second channel 1512, the first channel 1511, and the fourth channel 1414 can be determined as the top priority 1553, the second priority 1552, the third priority 1551, and the fourth priority 1554, respectively. The priority 1550 may become a criterion for changing a size of a channel banner, an output scheme, an output location, and the like.

Figure 16:
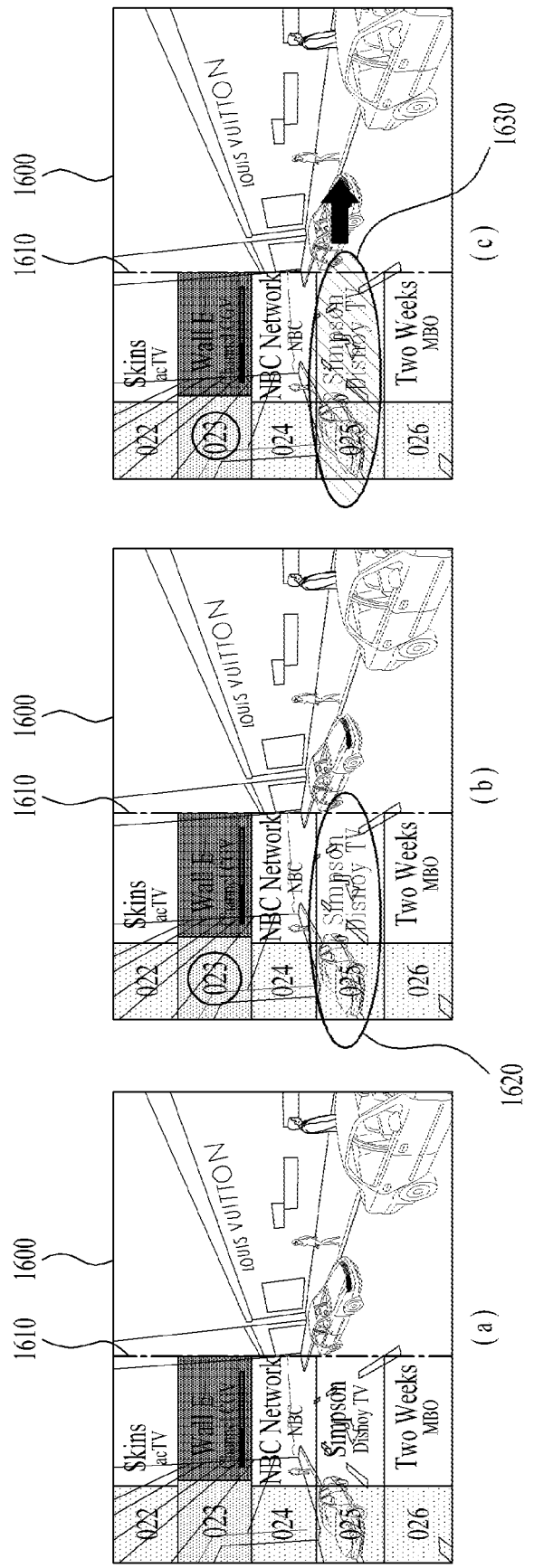
FIG. 16 is a diagram for explaining an example for a display device according to one embodiment of the present invention to adjust transparency of a channel banner.

FIG. 16 is a diagram for explaining an example for a display device according to one embodiment of the present invention to adjust transparency of a channel banner.

If a broadcast channel change signal is received more than a first number within a predetermined time period, the controller of the display device 1600 according to one embodiment of the present invention extracts a viewing history data of a user by accessing a memory and can adjust transparency of a channel banner 1620 of a channel, which is not watched by the user for more than a predetermined time, among channels included in the second broadcast channel banner list 1610 based on the extracted viewing history data of the user. For instance, as depicted in FIG. 16 (*a*), if there is no channel for which the user does not watch more than a predetermined first hour among the broadcast channels included in the second broadcast channel banner list 1610, transparency of a channel banner of each channel may be identical to each other. On the contrary, as depicted in FIG. 16 (*b*), when the broadcast channel change signal is received more than a first number within the predetermined time period, if there exists a channel for which the user does not watch more than the predetermined first hour among the broadcast channels included in the second broadcast channel banner list 1610, the controller of the display device 1600 can control the transparency of a channel banner of the channel for which the user does not watch more than the predetermined first hour to increase. Moreover, as depicted in FIG. 16 (*c*), when the broadcast channel change signal is received more than the first number within the predetermined time period, if there exists a channel for which the user does not watch more than a predetermined second hour among the broadcast channels included in the second broadcast channel banner list 1610, the controller of the display device 1600 can control the transparency of a channel banner 1630 of the channel for which the user does not watch more than the predetermined second hour to be invisible from the second broadcast channel banner list 1610 in a manner of adjusting the transparency of the channel banner to 100%. The second hour means a time longer than the first hour. The first and the second hour are default values and can be set to 2 weeks and 4 weeks, respectively. The first and the second hour can be modified by a user. And, the first and the second hour can be measured from the last watching date 1530 included in the viewing history data depicted in FIG. 15 as a reference time. By designing the display device according to FIG. 16, visibility for a channel banner of a channel not preferred by a user can be reduced and the visibility for a channel banner of a channel preferred by a user can be enhanced.

Figure 17:
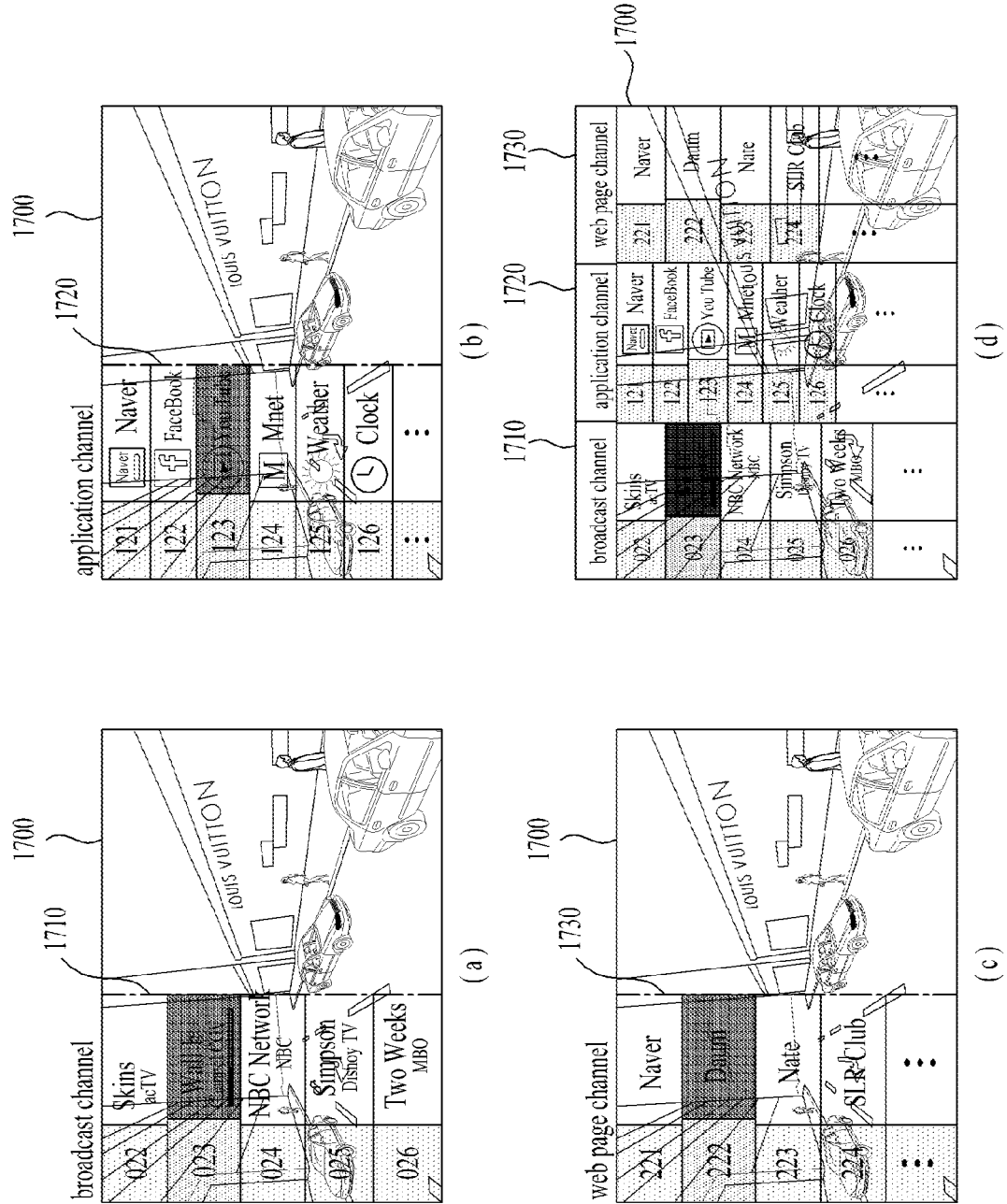
FIG. 17 is a diagram for explaining an example for a display device according to one embodiment of the present invention to receive a channel type change request signal and output an application channel banner list and a web page channel banner list.

FIG. 17 is a diagram for explaining an example for a display device according to one embodiment of the present invention to receive a channel type change request signal and output an application channel banner list and a web page channel banner list.

As depicted in FIG. 17 (*a*), the controller of the display device 1700 according to one embodiment of the present invention can output a first broadcast channel banner list including channel banners of broadcast channels received by the display device 1700 in a screen, receive a broadcast channel change signal more than a first number within a predetermined time period, and control a second broadcast channel banner list, which has changed a size of the channel banners of channels included in the first broadcast channel banner list 1410, to be output in the screen. And, as depicted in FIG. 17 (*b*) and FIG. 17 (*c*), the controller of the display device 1700 can receive a channel type change request signal and control a channel banner list 1720/1730 corresponding to the received channel type change request signal to be output in the screen. The channel type change request signal may include a first channel type change request signal for making a request for an output of an application channel banner list 1720 and a second channel type change request signal for making a request for an output of a web page channel banner list 1730. The controller of the display device 1700 according to one embodiment of the present invention can allocate a channel number to an application and a web page. The application channel banner list 1720 can include channel banners of an allocated application channel and the web page channel banner list 1730 can include channel banners of an allocated web page channel. Moreover, as depicted in FIG. 17 (*d*), if an output request signal of the total channel banner lists is received, the controller of the display device 1700 can control the second broadcast channel banner list 1710, the application channel banner list 1720, and the web page channel banner list to be simultaneously output. The output request signal of the total channel banner lists can be generated by a direction key of the remote controller. And, the output request signal of the total channel banner lists may correspond to an event where a broadcast channel change signal is received more than the first number within the predetermined time. By designing the display device as above-mentioned, a user can easily and promptly search for channels allocated to such a different content as an application, a web page, and the like as well as a broadcast channel.

Figure 18:
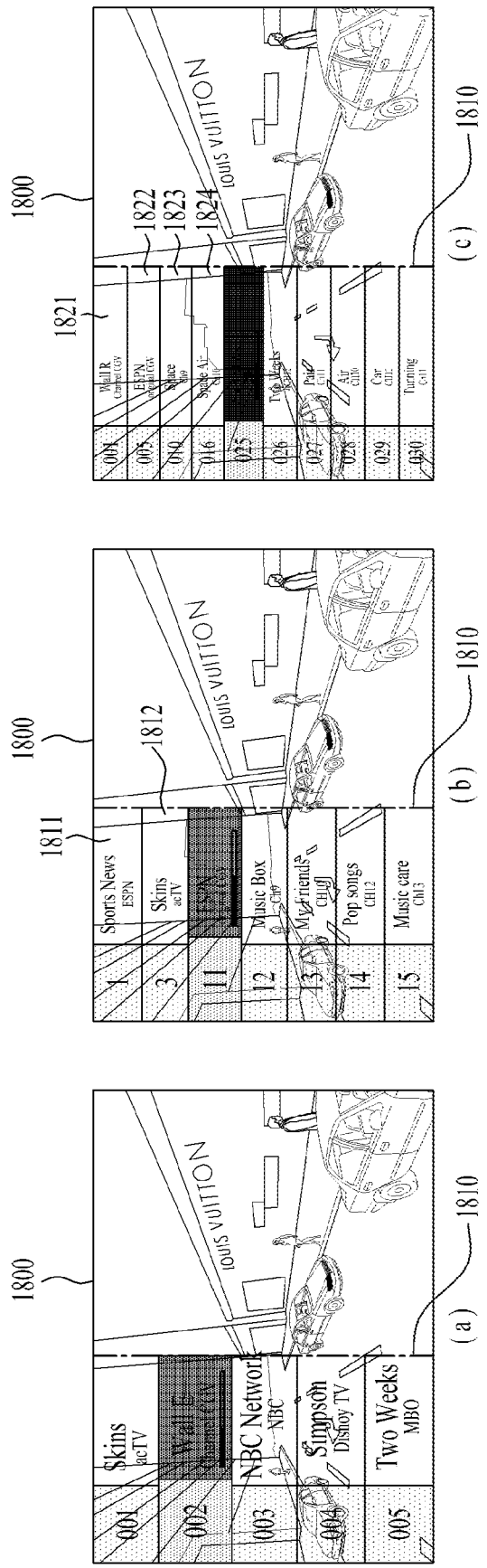
FIG. 18 is a diagram for explaining an example for a display device according to one embodiment of the present invention to edit a broadcast channel banner list based on channel preference of a user and viewer ratings data.

FIG. 18 is a diagram for explaining an example for a display device according to one embodiment of the present invention to edit a broadcast channel banner list based on channel preference of a user and viewer ratings data.

The controller of the display device 1800 according to one embodiment of the present invention receives channel preference of a user and viewer ratings data and can determine whether to output a channel banner based on the received channel preference of the user and the viewer ratings data. For instance, as depicted in FIG. 18, if a broadcast channel banner list 1810 is output and a first channel change signal, which increases a channel number, is received, the controller of the display device 1800 outputs channel banners 1811/1812/1821/1822/1823/1824 of a channel only, which has a channel preference of a user and viewer ratings greater than a reference value, among the channels including a channel number lower than a channel number of a currently selected channel banner and can control channel banner of a channel, which has the channel preference of the user and viewer ratings less than the reference value, among the channels including the channel number lower than the channel number of the currently selected channel banner not to be output. And, in case of outputting the channel banner of the channel only, which has the channel preference of the user and the viewer ratings greater than the reference value, among the channels including the channel number lower than the channel number of the currently selected channel banner in the screen, the number of output channel banners can be configured by the user. For instance, FIG. 18 (*b*) and FIG. 18 (*c*) are examples of the number of output channel banners set by 2 and 4, respectively. Hence, by editing the broadcast channel banner list according to the channel preference of the user and the viewer ratings, the user can easily distinguish a channel of high preference from a channel of low preference.

Figure 19:
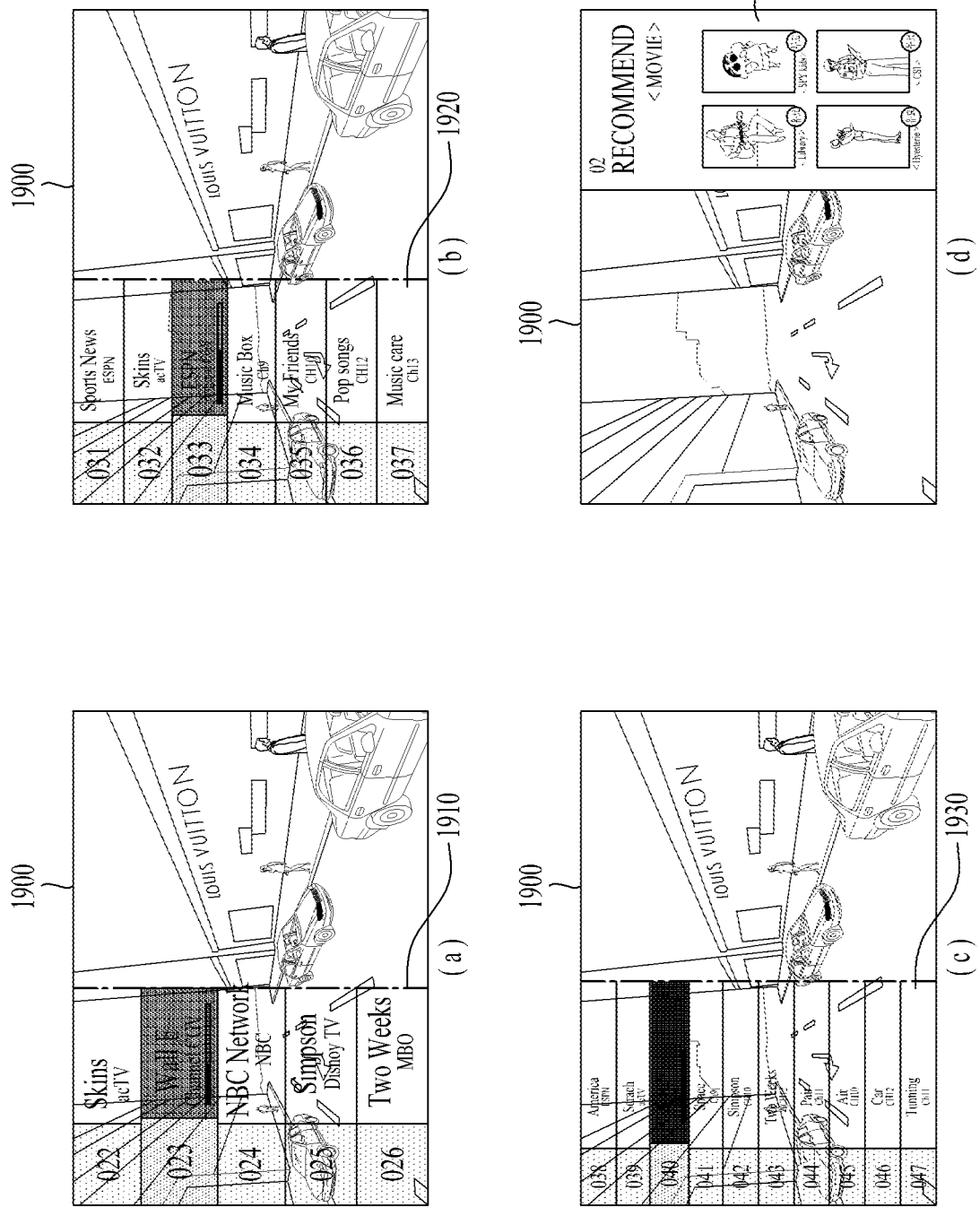
FIG. 19 is a diagram for explaining an example for a display device according to one embodiment of the present invention to output a recommended content page in a screen after a channel change signal is received.

FIG. 19 is a diagram for explaining an example for a display device according to one embodiment of the present invention to output a recommended content page in a screen after a channel change signal is received.

As depicted in FIG. 19, the controller of the display device 1900 according to one embodiment of the present invention can output a first broadcast channel banner list 1910 including channel banners of broadcast channels received by the display device 1900 in a screen, receive a broadcast channel change signal more than a first number within a predetermined time period, and control a second broadcast channel banner list 1920, which has changed a size of the channel banners of channels included in the first broadcast channel banner list 1910, to be output in the screen. And, the controller of the display device 1900 receives the broadcast channel change signal more than a second number within the predetermined time period and can control a recommended content page to be output in the screen in a manner of generating the recommended page 1940 including recommended content information relevant to a broadcast program currently outputting. The second number may correspond to the number greater than the first number and the recommended content information may include title information of the recommended content, category information of the recommended content, and charge information of the recommended content. As depicted in FIG. 19 (*a*), the controller of the display device 1900 according to one embodiment of the present invention can output a first broadcast channel banner list 1910 including channel banners of broadcast channels in a screen. And, as depicted in FIG. 19 (*b*), if a first channel change signal, which increases a channel number, is received more than the first number within the predetermined time period, the controller of the display device 1900 generates a second broadcast channel banner list 1920 in a manner of reducing a size of channel banners of channels included in the first broadcast channel banner list 1910 and can control the second broadcast channel banner list to be output in a screen. Moreover, as depicted in FIG. 19 (*c*), if the first channel change signal, which increases a channel number, is further received more than the first number within the predetermined time period after FIG. 19 (*b*), the controller of the display device 1900 generates a third broadcast channel banner list 1930 in a manner of further reducing a size of channel banners of channels included in the second broadcast channel banner list 1920 and can control the third broadcast channel banner list to be output in the screen. Moreover, as depicted in FIG. 19 (*d*), if the first channel change signal, which increases a channel number, is received more than a second number within the predetermined time period followed by FIG. 19 (*c*), the controller of the display device 1900 generates a recommended content page 1940 including recommended content information relevant to a broadcasting program currently outputting and can control the recommended content page to be output in the screen. For instance, the recommended content included in the recommended content page 1940 may correspond to content relevant to a main character of the broadcast program currently outputting or content relevant to a director of the broadcast program currently outputting. And, the recommended content page 1940 can also be output in the screen in case of receiving a specific function key signal of an external input means.

Figure 20:
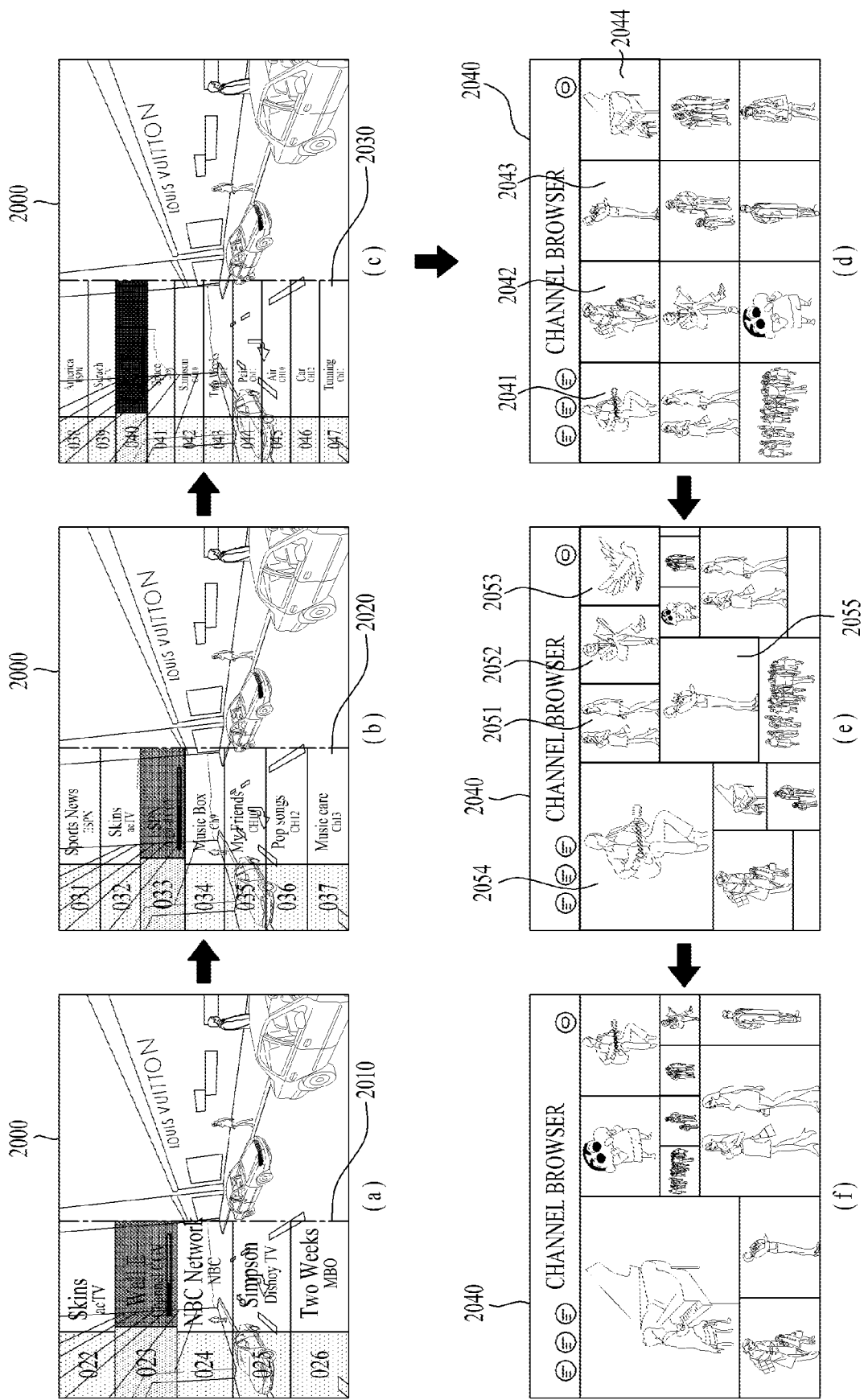
FIG. 20 is a diagram for explaining an example for a display device according to one embodiment of the present invention to output a channel browser in a screen after a channel change signal is received.

FIG. 20 is a diagram for explaining an example for a display device according to one embodiment of the present invention to output a channel browser in a screen after a channel change signal is received.

The controller of the display device 2000 according to one embodiment of the present invention can output a first broadcast channel banner list 2010 including channel banners of broadcast channels received by the display device 2000 in a screen, receive a broadcast channel change signal more than a first number within a predetermined time period, and control a second broadcast channel banner list 2020, which has changed a size of the channel banners of channels included in the first broadcast channel banner list 2010, to be output in the screen. And, the controller of the display device 2000 receives the broadcast channel change signal more than a second number within the predetermined time period and can control a channel browser 2040 to be output in the screen. The second number may correspond to a number greater than the first number. The channel browser may include channel windows 2041/2042/2043/2044 of the broadcast channels received by the display device. The channel windows 2041/2042/2043/2044 may include video data, audio data, and Meta data of a program currently broadcasting on each channel. As depicted in FIG. 20 (*a*), the controller of the display device 2000 according to one embodiment of the present invention can output a first broadcast channel banner list 2010 including channel banners of broadcast channels in a screen. And, as depicted in FIG. 20 (*b*), if a first channel change signal, which increases a channel number, is received more than the first number within the predetermined time period, the controller of the display device 2000 generates a second broadcast channel banner list 2020 in a manner of reducing a size of channel banners of channels included in the first broadcast channel banner list 2010 and can control the second broadcast channel banner list to be output in a screen. Moreover, as depicted in FIG. 20 (*c*), if the first channel change signal, which increases a channel number, is further received more than the first number within the predetermined time period followed by FIG. 20 (*b*), the controller of the display device 2000 generates a third broadcast channel banner list 2030 in a manner of further reducing a size of channel banners of channels included in the second broadcast channel banner list 2020 and can control the third broadcast channel banner list to be output in the screen. Moreover, as depicted in FIG. 20 (*d*), if the first channel change signal, which increases a channel number, is received more than a second number within the predetermined time period followed by FIG. 20 (*c*), the controller of the display device 2000 can control the channel browser 2040 consisting of the channel windows 2041/2042/2043/2044, which include video data, audio data, and meta data of the channels corresponding to the channel banners included in the third broadcast channel banner list 2030, to be output in the screen. And, as depicted in FIG. 20 (*e*), the controller of the display device 2000 can adjust a size of channel windows of the channels included in the channel browser 2040 in a manner of receiving viewer ratings data of the broadcast channels received from an external server by the display device 2000, determining the size of channel windows 2051/2052/2053 of a channel where viewer ratings is less than a predetermined value as a first channel window size, and determining the size of channel windows 2054/2055 of a channel where viewer ratings is greater than the predetermined value as a second channel window size. And, the first channel window size may be smaller than the second channel window size. Moreover, as depicted in FIG. 20 (*f*), the controller of the display device 2000 extracts viewing history data of a user by accessing a memory and can adjust the size of the channel windows of the channels included in the channel browser 2040 based on priority information included in the extracted viewing history data of the user. In particular, the controller of the display device can adjust a size of a channel window in a manner that the size of the channel window of a channel where viewer ratings or priority is high is bigger than the size of the channel window of a channel where the viewer ratings or the priority is low.

By designing the display device according to FIG. 19 and FIG. 20, if a channel search of a user becomes longer, a content recommendation service is provided to the user or a channel browser capable of identifying various channels at the same time is provided to the user, thereby enhancing user convenience.

Figure 21:
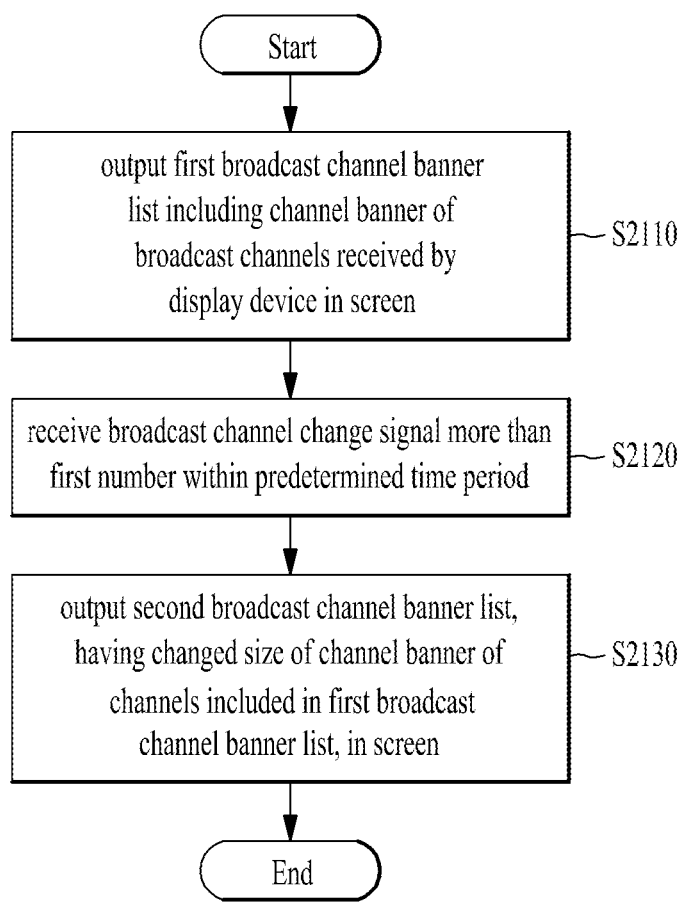
FIG. 21 is a flowchart for a method of controlling a display device according to one embodiment of the present invention.

FIG. 21 is a flowchart for a method of controlling a display device according to one embodiment of the present invention. As depicted in FIG. 21, the display device according to one embodiment of the present invention outputs a first broadcast channel banner list including channel banners of broadcast channels received by the display device in a screen [S2110], receives a broadcast channel change signal more than a first number within a predetermined time period [S2120], and can output a second broadcast channel banner list, which has changed a size of the channel banners of the channels included in the first broadcast channel banner list, in the screen [S2130]. Since detailed explanation on each step is already described in the foregoing description, repeated explanation is omitted.

For clarity of explanation, each diagram is explained in a manner of being divided. Yet, it is possible to design a new embodiment to implement the new embodiment by combining the embodiments, which are described in each of the diagrams. And, a display device and a method of controlling therefor according to one embodiment may not limitedly apply to the composition and method of the aforementioned embodiments. The aforementioned embodiments may be configured in a manner of being selectively combined the whole of the embodiments or a part of the embodiments to achieve various modifications.

While the present invention has been described and illustrated herein with reference to the preferred embodiments and diagrams thereof, the present invention may be non-limited to the aforementioned embodiments and it will be apparent to those skilled in the art that various modifications and variations can be made therein without departing from the spirit and scope of the present invention. Thus, it is intended that the present invention covers the modifications and variations of this invention that come within the scope of the appended claims and their equivalents.

And, both an apparatus invention and a method invention are explained in the present specification and the explanation on the both of the inventions can be complementally applied, if necessary.

What is claimed is:

1. A method of controlling a display device, the method comprising:
    outputting a first broadcast channel banner list including a channel banner of broadcast channels received by the display device;
    receiving a broadcast channel change signal more than a first number of instances within a predetermined time period;
    outputting a second broadcast channel banner list in which a size of the channel banner of the broadcast channels included in the first broadcast channel banner list has changed;
    receiving a current viewer ratings data of channels included in the second broadcast channel banner list from an external server; and
    adjusting a size of a channel banner of the channels included in the second broadcast channel banner list in a manner of determining a size for a channel banner of a channel as a first channel banner size when viewer ratings is less than a predetermined value and determining a size for a channel banner of a channel as a second channel banner size when viewer ratings is greater than or equal to the predetermined value, wherein the channel banner includes a broadcast channel number, title information of a broadcast program, and a progress bar graphical user interface (GUI) of the broadcast program, wherein the first channel banner size is smaller than the second channel banner size, and wherein, in case of initially outputting the first broadcast channel banner list, a channel banner corresponding to a broadcast channel currently output on the screen is displayed in a manner of being highlighted, and wherein a position of the currently selected channel banner within the first broadcast banner list is determined to be a position which implies a position of the selected channel banner among a total number of channel banners.

2. The method of claim 1, wherein, the channel banner displays both title information of a program currently broadcasting and title information of a program to be broadcasted followed by the program currently broadcasting together when remaining broadcasting time of the program currently broadcasting is less than or equal to a predetermined time.

3. The method of claim 1, further comprising:
extracting a viewing history data of a user by accessing a memory; and
adjusting transparency of a channel banner of a channel, which has not been watched by the user for more than a predetermined amount of time, among broadcast channels included in the second broadcast channel banner list based on the extracted viewing history data of the user.

4. The method of claim 1, further comprising:
receiving a channel type change request signal; and
outputting a channel banner list corresponding to the received channel type change request signal,
wherein the channel type change request signal includes a first channel type change request signal for requesting an output of an application channel banner list and a second channel type change request signal for requesting an output of a web page channel banner list.

5. The method of claim 1, further comprising:
receiving the broadcast channel change signal more than a second number of instances within the predetermined time period; and
generating a recommended content page including recommended content information relevant to a broadcast program currently being output and outputting the generated recommended content page,
wherein the second number is more than the first number, and
wherein the recommended content information includes title information, category information, and charge information of the recommended content.

6. The method of claim 1, further comprising:
receiving the broadcast channel change signal more than a second number of instances within the predetermined time period; and
outputting a channel browser,
wherein the second number is more than the first number,
wherein the channel browser includes a channel window of the broadcast channels received by the display device, and
wherein the channel window includes video data, audio data, and metadata of a program currently broadcasting on each channel.

7. The method of claim 6, further comprising:
receiving the viewer ratings data of the broadcast channels received by the display device from an external server; and
adjusting a size of the channel window of the channels included in the channel browser in a manner of determining a size for a channel window of a channel as a first channel window size when a viewer ratings is less than a second predetermined value and determining a size for a channel window of a channel as a second channel window size when the viewer ratings is greater than or equal to the second predetermined value,
wherein the first channel window size is smaller than the second channel window size.

8. A display device, comprising:
a display module configured to output a broadcast program and a channel banner list;
a communication module configured to perform a data communication with an external server;
a receiving unit configured to receive a channel change signal;
a memory configured to store a viewing history data of a user; and
a controller configured to control an operation of the display device,
wherein the controller is further configured to output a first broadcast channel banner list including a channel banner of broadcast channels received by the display device in a screen, receive a broadcast channel change signal more than a first number of instances within a predetermined time period, output a second broadcast channel banner list in which a size of the channel banner of the broadcast channels included in the first broadcast channel banner list has changed,
receive a current viewer ratings data of channels included in the second broadcast channel banner list from an external server and adjust a size of a channel banner of the channels included in the second broadcast channel banner list in a manner of determining a size for a channel banner of a channel as a first channel banner size when a viewer ratings is less than a predetermined value and determining a size for a channel banner of a channel as a second channel banner size when the viewer ratings is greater than or equal to the predetermined value,
display a channel banner corresponding to a broadcast channel currently output on the screen to be highlighted when initially outputting the first broadcast channel banner list, and
determine a position of the currently selected channel banner within the first broadcast channel banner list to be a position which implies a position of the currently selected channel banner among a total number of channel banners,
wherein the channel banner includes a broadcast channel number, title information of a broadcast program, and a progress-bar graphical user interface (GUI) of the broadcast program, and
wherein the first channel banner size is smaller than the second channel banner size.

9. The display device of claim 8, wherein the channel banner displays both title information of a program currently being broadcast and title information of a program to be broadcasted followed by the program currently broadcast together when remaining broadcasting time of the program currently broadcast is less than or equal to a predetermined time.

10. The display device of claim 8, wherein the controller is further configured to extract a viewing history data of a user by accessing a memory and adjust transparency of a channel banner of a channel, which has not been watched by the user for more than a predetermined amount of time, among broadcast channels included in the second broadcast channel banner list based on the extracted viewing history data of the user.

11. The display device of claim 8, wherein the controller is further configured to receive a channel type change request signal and output a channel banner list corresponding to the received channel type change request signal, wherein the channel type change request signal includes a first channel type change request signal for requesting an output of an application channel banner list and a second channel type change request signal for requesting an output of a web page channel banner list.

12. The display device of claim 8, wherein the controller is further configured to receive the broadcast channel change signal more than a second number of instances within the predetermined time period, generate a recommended content page including recommended content information relevant to a broadcast program currently being output and output the generated recommended content page, wherein the second number is more than the first number, and wherein the recommended content information includes title information, category information, and charge information of the recommended content.

13. The display device of claim 8, wherein the controller is further configured to receive the broadcast channel change signal more than a second number of instances within the predetermined time period and output a channel browser, wherein the second number is more than the first number, wherein the channel browser includes a channel window of the broadcast channels received by the display device, and wherein the channel window includes video data, audio data, and metadata of a program currently broadcasting on each channel.

* * * * *